(12) United States Patent
Lord

(10) Patent No.: US 8,769,392 B2
(45) Date of Patent: *Jul. 1, 2014

(54) SEARCHING AND SELECTING CONTENT FROM MULTIPLE SOURCE DOCUMENTS HAVING A PLURALITY OF NATIVE FORMATS, INDEXING AND AGGREGATING THE SELECTED CONTENT INTO CUSTOMIZED REPORTS

(75) Inventor: Daniel J. Lord, Huddersfield (GB)

(73) Assignee: Content Catalyst Limited, Castleford (GB)

( * ) Notice: Subject to any disclaimer, the term of this patent is extended or adjusted under 35 U.S.C. 154(b) by 569 days.

This patent is subject to a terminal disclaimer.

(21) Appl. No.: 12/787,519

(22) Filed: May 26, 2010

(65) Prior Publication Data

US 2011/0296321 A1     Dec. 1, 2011

(51) Int. Cl.
  *G06F 17/27*     (2006.01)
(52) U.S. Cl.
  USPC ................ 715/200; 715/273; 715/277
(58) Field of Classification Search
  USPC .......................... 715/200, 273, 277
  See application file for complete search history.

(56) References Cited

U.S. PATENT DOCUMENTS

| | | | | |
|---|---|---|---|---|
| 5,428,735 A | * | 6/1995 | Kahl et al. ............ | 715/839 |
| 5,706,504 A | * | 1/1998 | Atkinson et al. ...... | 1/1 |
| 5,715,441 A | * | 2/1998 | Atkinson et al. ...... | 713/152 |
| 5,819,271 A | * | 10/1998 | Mahoney et al. ..... | 1/1 |
| 5,832,494 A | | 11/1998 | Egger et al. | |
| 5,864,871 A | * | 1/1999 | Kitain et al. .......... | 1/1 |
| 5,917,480 A | * | 6/1999 | Tafoya et al. ......... | 715/732 |
| 5,923,846 A | * | 7/1999 | Gage et al. ........... | 709/213 |
| 5,956,740 A | * | 9/1999 | Nosohara ............. | 715/264 |
| 5,966,126 A | * | 10/1999 | Szabo .................. | 715/762 |
| 6,014,680 A | | 1/2000 | Sato et al. | |
| 6,023,715 A | | 2/2000 | Burkes et al. | |
| 6,138,129 A | | 10/2000 | Combs | |
| 6,154,756 A | * | 11/2000 | Hearn et al. .......... | 715/236 |
| 6,424,980 B1 | | 7/2002 | Lizuka et al. | |
| 6,516,308 B1 | | 2/2003 | Cohen | |
| 6,567,796 B1 | * | 5/2003 | Yost et al. ............ | 1/1 |

(Continued)

FOREIGN PATENT DOCUMENTS

WO    WO 01/97085 A1    12/2001

OTHER PUBLICATIONS

The Microsoft Office Open XML Formats: Preview for Developers; Jun. 2005; Microsoft; pp. 1-30.*

(Continued)

*Primary Examiner* — Andrew Dyer
(74) *Attorney, Agent, or Firm* — Sampson & Associates, P.C.

(57) ABSTRACT

A computer implemented system and method in a client-server environment, is provided for document research, aggregation, and compilation. The system and method includes a server having a search module configured to generate a search interface displayable to a client communicably coupled to the server, and responsive to instructions received via the search interface, to search and sort selections of interest within a plurality of source documents. A customized report module is configured to generate a custom report interface displayable to the client, and responsive to user selection instructions received via the custom report interface, to extract and aggregate the selections of interest into a customized report. PDF, PPT, and XLS modules are configured to respectively enable source documents in the PDF, PPT, and XLS formats to be searched, sorted, and aggregated by the search module and customized report module.

33 Claims, 22 Drawing Sheets

(56) References Cited

U.S. PATENT DOCUMENTS

| | | | |
|---|---|---|---|
| 6,732,102 B1 | 5/2004 | Khandekar | |
| 6,826,553 B1* | 11/2004 | DaCosta et al. | 1/1 |
| 7,047,502 B2* | 5/2006 | Petropoulos et al. | 715/781 |
| 7,069,501 B2 | 6/2006 | Kunitake et al. | |
| 7,200,605 B2 | 4/2007 | Baker | |
| 7,246,305 B2* | 7/2007 | Batres | 715/234 |
| 7,617,447 B1* | 11/2009 | Jones et al. | 715/234 |
| 7,818,660 B2* | 10/2010 | Massand | 715/209 |
| 7,996,380 B2* | 8/2011 | Arrouye et al. | 707/707 |
| 8,086,604 B2* | 12/2011 | Arrouye et al. | 707/731 |
| 8,108,404 B2* | 1/2012 | Sylthe et al. | 707/749 |
| 2002/0129054 A1* | 9/2002 | Ferguson et al. | 707/503 |
| 2002/0129058 A1 | 9/2002 | Story et al. | |
| 2005/0177562 A1* | 8/2005 | Raciborski | 707/3 |
| 2005/0216429 A1* | 9/2005 | Hertz et al. | 707/1 |
| 2005/0234891 A1* | 10/2005 | Walther et al. | 707/3 |
| 2005/0240618 A1* | 10/2005 | Nickerson et al. | 707/102 |
| 2006/0050996 A1* | 3/2006 | King et al. | 382/312 |
| 2006/0074980 A1* | 4/2006 | Sarkar | 707/104.1 |
| 2006/0136477 A1* | 6/2006 | Bishop et al. | 707/102 |
| 2007/0043689 A1 | 2/2007 | So | |
| 2007/0136276 A1* | 6/2007 | Vella | 707/5 |
| 2008/0065675 A1* | 3/2008 | Bozich et al. | 707/102 |
| 2008/0162498 A1 | 7/2008 | Omoigui | |
| 2008/0250068 A1* | 10/2008 | Martyn et al. | 707/104.1 |
| 2009/0077658 A1 | 3/2009 | King et al. | |
| 2009/0150169 A1 | 6/2009 | Kirkwood et al. | |
| 2009/0234818 A1 | 9/2009 | Lobo et al. | |
| 2010/0070448 A1* | 3/2010 | Omoigui | 706/47 |

OTHER PUBLICATIONS iReports—4th Generation; Mar. 19, 2012; PublishInteractive.com; pp. 1-2.*

Client letter; Live Systems; Jan. 27, 2007; Publishinteractive.com; pp. 1-2.*

"Report;" Microsoft Computer Dictionary; May 1, 2002; Microsoft Press; Fifth Edition; p. 565.*

Allen G. Taylor; Crystal Reports 2008 for Dummies; 2008; Wiley Publishing, Inc.; pp. 207-218.*

Publish Interactive, "End-user Features & Benefits", brochure, published on or about Oct. 2012, 6 pgs, Content Catalyst Limited, Castleford, UK.

Publish Interactive, "The Ultimate ePublishing platform", brochure, published 2008, 16 pgs, Content Catalyst Limited, Castleford,UK.

Publish Interactive, "Release notes: v.4.4-v4.6", brochure, published on or about Jul. 2013, 6 pgs, Content Catalyst Limited, Castleford, UK.

* cited by examiner

| USER TABLE | | | | |
|---|---|---|---|---|
| USER ID | NAME | ADDRESS | PHONE# | SUBSCRIPTION STATUS |
| ~ | ~ | ~ | ~ | ~ |
| 61 | 63 | 65 | 67 | 69 |

| 60 | 97 | 98 | 99 |
|---|---|---|---|
| ReportID | VersionNumber | Date | UploadedByUserID |
| 1 | 1 | 1-Oct-09 | 324 |
| 1 | 2 | 1-Mar-10 | 646 |

*FIG. 4G*

| Home | Find | View | UserName (1) |

Innovation in Natural and Organic Food and Drinks (June 2006) | Browse & Search | Figures | Tables | Split screen | Translate | Download | Cut your own ⊞ Cover page
⊞ Executive Summary
⊟ Introduction
  ⊞ Alcoholic Drinks in Belgium
  ⊞ Alcoholic Drinks Market in CZ
  ⊟ Lorem ipsum dolor...
  → Sed do eiusmod incididunt ut...

↑
*202*

Digital delivery: Consumer broadband penetration

Chapter Outline | Minimise    *200*    *204*

> Summary     > Digital subscriber line (DSL)
> Develop a narrowband strategy    > Develop partnerships to build brands
> Market overview    > Cable broadband
> Invest in security services    > Service bundles
> Market context    > Other broadband technologies
> Scale up in the call centers    > Market winners will be decided shortly
> Market sizing    > Conclusions
> Refresh and upgrade the product portfolio Market Overview Broadband has come of age with the arrival of 'multiplay' services. The potential to...

Market Overview

Although broadband markets in North America and Western Europe are clearly...

Market Overview

Although broadband markets in North America and Western Europe are clearly...

Text size: A A A
Save chapter to Word
Save tables to Excel
Save figures to PowerPoint
Print chapter
Send by email
Rate this section

↑
*206*

▢ Copy
▢ Add comment

▢ Copied   *208*

▢ Remove from copied

Comments on this section (2) | Add comment     Expand ☐

Frank Smith, 2:15PM, 25th February 2008
Lorem ipsum dolor sit amet, consectetur adipisicing elit...

Bea Jones, 2:40PM, 25th February 2008
Ut enim ad minim veniam, quis nostrud exercitation ullamco...

∧ To the top     < Previous chapter    Next chapter >

*FIG. 8*

| Home | Find | View | UserName (1) |

Innovation in Natural and Organic Food and Drinks (June 2006) | Browse & Search | Figures | Tables | Split screen | Translate | Download | Cut your own Cover page
Executive Summary
Introduction
Alcoholic Drinks Market in Belgium
Alcoholic Drinks Market in France
Alcoholic Drinks Market in Germany
Alcoholic Drinks Market in Hungary
Alcoholic Drinks Market in Italy Digital delivery: Consumer broadband penetration Chapter Outline | Minimise                                              *212*

>Summary                              >Digital subscriber line (DSL)
>Develop a narrowband strategy        >Develop partnerships to build brands
>Market overview                      >Cable broadband
>Invest in security services          >Service bundles
>Market context                       >Other broadband technologies
>Scale up in the call centers         >Market winners will be decided shortly
>Market sizing                        >Conclusions
>Refresh and upgrade the product portfolio Original Text                                    Translation to German
---

Market Overview
Broadband has come of age with the arrival of 'multiplay'...   (12)   Translation in progress, please wait...

Market Overview
Although broadband markets in North America and...           Translation in progress, please wait...

Market Overview
Although broadband markets in North America and...    (2)    Translation in progress, please wait...

Comments on this section (2) | Add comment          Expand ☐

Frank Smith, 2:15PM, 25th February 2008
Lorem ipsum dolor sit amet, consectetur adipisicing elit...

Bea Jones, 2:40PM, 25th February 2008
Ut enim ad minim veniam, quis nostrud exercitation ullamco...

∧ To the top          <Previous chapter   Next chapter>

*FIG. 10*

| Home | Find | View | UserName (1) |

Search results for "keyword"                                    Advanced search | Search results 🔍 Search
- Keyword
- ☐ Related terms
- ☐ Only tables
- Search

Advanced options

Switch to Advanced options to narrow your search to specific report areas.

Matching reports                    *214*                Print ☐

11/21/2008   Major Depression in China
210 pages    ☐ 9 Matches in 4 chapters
             ☐ Introduction (1)
             ☐ Research Protocol (3)
             ☐ Improvements in Food Shopping Over 2003 (4)
             ☐ Charges Over Time (5)
             ☐ Growth in Price Conscious Consumers (11)
             ☐ Have Expectations Been Met? (1)
             ☐ Useable Information (1)
             ☐ Summary (2)

11/21/2008   Fulfilling the Promise of Personalized Medicine Through
210 pages    Next-Generation Sequencing
             ☐ 9 Matches in 4 chapters 11/21/2008   Personalized Medicine Through
             Next-Generation Sequencing
             ☐ 9 Matches in 4 chapters 11/21/2008   Fulfilling the Promise of Personalized Medicine Through
210 pages    Next-Generation Sequencing
             ☐ 9 Matches in 4 chapters 11/21/2008   Major Depression in China
210 pages    ☐ 9 Matches in 4 chapters
             ☐ Introduction (1)
             ☐ Research Protocol (3)

∧ To the top

Creating your report

View and create your own report from selected different reports sections.

Sections copied (3)
- Improvements in Food Shopping (4)
- Have expectations been met? (1)
- Changes over time (5)

View

------------ OR ------------

Once you have created a report, you can save it to
- Copy all selected sections to clipboard
- Save to Word
- Save tables to Excel
- Save figures to PowerPoint

SEARCHING AND SELECTING CONTENT FROM MULTIPLE SOURCE DOCUMENTS HAVING A PLURALITY OF NATIVE FORMATS, INDEXING AND AGGREGATING THE SELECTED CONTENT INTO CUSTOMIZED REPORTS

BACKGROUND

1. Technical Field

This invention relates to web-enabled transactions, and more particularly to an automated system for document research, aggregation, and report generation.

2. Background Information

Existing publishing systems provide mechanisms for searching and navigating through a library of documents. Such systems, however, are limited in their ability enable users to repurpose content from source documents into their own project reports. For example, business consulting firms typically spend considerable staff time assembling relevant findings from various sources into a report that is specifically tailored to a particular client's project. This task often requires considerable human operator time to: identify and assemble relevant content from a range of source material types; convert each to a common file format; maintain a record of the source documents, including author, publisher, publication dates, terms of use, etc.; provide output of aggregated content in desired output file formats; facilitate peer review and provide reference to the original sources; and retain selection criteria and other records in order to regenerate the report at a later date based on updated source documents.

Moreover, conventional approaches used to automate portions of this process have faltered in their attempts to convert the source material from their various native formats into a common format to facilitate manipulation. These approaches have either been unable to convert some formats (e.g., from image formats into text), or have done so in a manner that has been prone to errors including loss of original content and/or loss of original formatting including pagination, line numbering, and visual integrity errors, etc. Moreover, because such errors are generated early in the process, on the source material, they tend to be propagated to all users of that material, and may also be compounded during subsequent reformatting into the desired output format.

Thus, a need exists for a system and method that addresses the foregoing limitations.

SUMMARY

One aspect of the invention includes a computer implemented system in a client-server environment, for document research, aggregation, and compilation. The system includes a server having a search module configured to generate a search interface displayable to a client communicably coupled to the server, and responsive to instructions received via the search interface, to search and sort selections of interest within a plurality of source documents. A customized report module is configured to generate a custom report interface displayable to the client, and responsive to user selection instructions received via the custom report interface, to extract and aggregate the selections of interest into a customized report. PDF, PPT, and XLS modules are configured to respectively enable source documents in the PDF, PPT, and XLS formats to be searched, sorted, and aggregated by the search module and customized report module.

Another aspect of the invention includes a method for automated document research, aggregation, and compilation, in a client-server environment. The method includes generating, with a server computer, a search interface displayable to a client communicably coupled to the server. The method further includes searching and sorting, with the server computer in response to instructions received via the search interface, selections of interest within a plurality of source documents. A custom report interface displayable to the client is generated with the server computer. The selections of interest are extracted and aggregated into a custom report, in response to user selection instructions received via the custom report interface. In response to user selection instructions, the server computer enables documents in the PDF, PPT, and XLS formats to be searched, sorted, extracted and aggregated into the customized report.

Yet another aspect of the invention includes an article of manufacture for automated document research, aggregation, and compilation, in a client-server environment. The article of manufacture includes a computer usable medium having a computer readable program code embodied therein for generating a search interface displayable to a client communicably coupled to the server. Computer readable program code is also provided for searching and sorting, in response to instructions received via the search interface, selections of interest within a plurality of source documents. The program code is also configured for generating a custom report interface displayable to the client, and extracting and aggregating, in response to user selection instructions received via the custom report interface, the selections of interest into a customized report. Program code is also provided for enabling, with the server computer in response to user selection instructions, documents in the PDF, PPT, and XLS formats to be searched, sorted, extracted and aggregated into the customized report.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The present invention is illustrated by way of example and not limitation in the figures of the accompanying drawings, in which like references indicate similar elements and in which:

FIG. 3 is a diagrammatic representation of one embodiment of a user table within the database;

FIGS. 4A-4G are diagrammatic representations of an embodiment of various data tables within the database;

FIGS. 8-15 are exemplary representations of various interfaces provided by the objects of FIG. 6.

DETAILED DESCRIPTION

Figure 1:
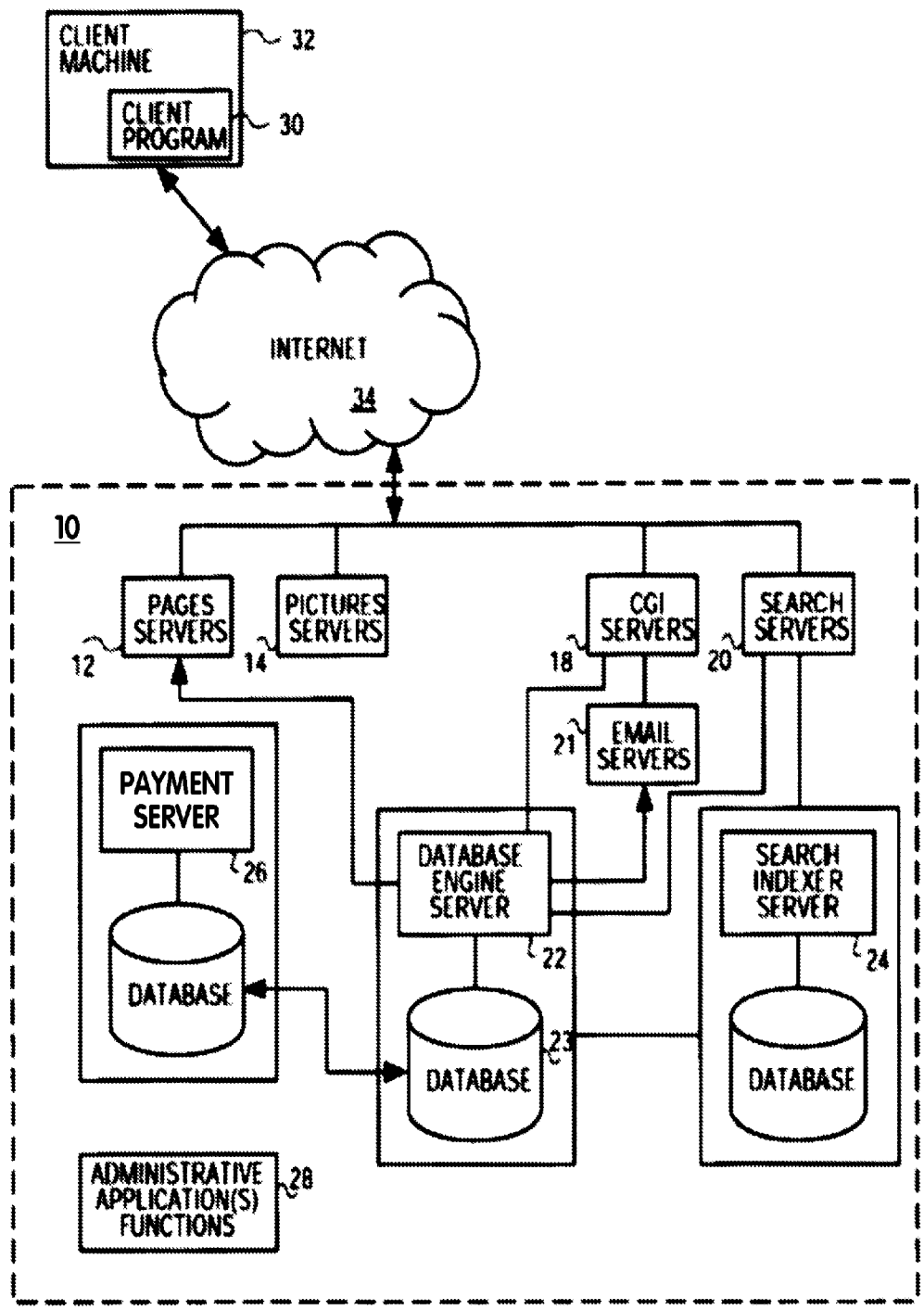
FIG. 1 is a block diagram of one embodiment of a network-based transaction facility of the present invention.

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. In addition, well-known structures, circuits and techniques have not been shown in detail in order not to obscure the understanding of this description. The following detailed description is, therefore, not to be taken in a limiting sense, and the scope of the present invention is defined by the appended claims and their equivalents.

General Overview

A method and apparatus for providing automated document research and report generation in a network-based transaction facility are described. In the following description, for purposes of explanation, numerous specific details are set forth in order to provide a thorough understanding of the present invention. It will be evident, however, to one skilled in the art that the present invention may be practiced without these specific details.

Embodiments of the present invention effectively automate the report generation process by: enabling users to automatically search and select sections of relevant reports based on the user's search criteria; enabling selected sections of distinct file formats (including .doc, .ppt, .xls and .pdf files, images, etc.), to be stored and indexed in their native formats; assembling the sections into a single, customized publication (report) that tracks the source of the sections for proper attribution, terms of use, etc.; and enables the customized publication to be viewed online by colleagues for comment, etc.

In particular, while some of these aspects may be at least partially provided by conventional systems, the present invention has overcome a significant problem in the prior art, namely that of enabling file portions of various mutually distinct formats to be conveniently aggregated, while maintaining accurate records of the source(s) of those file portions (sections), including their location(s) within the source documents. Embodiments of the invention provide this capability by operating contrary to the accepted practice of converting source material of various native formats into a common format prior to use. Instead of attempting such conversions, these embodiments generate and store a definition of a user's custom report in the form of a sequence of references to the source material portions in their native formats (e.g., .doc, .ppt, .xls, .pdf, etc.). Each selected source document portion is thus parsed/tracked using units/parameters that are appropriate to those formats, such as slide numbers (for POWERPOINT), cell coordinates (for .xls), paragraph numbers (for .doc), or rectangles having particular position coordinates on a page (for images, .pdf, etc.).

The system then uses the selected source document portions in their native formats (effectively inserting them 'as-is' into the custom report/publication), while tracking the particular units/parameters in a data table linked to the custom report. This approach thus conveniently and accurately permits source documents of substantially any native format to be conveniently incorporated into the custom report without generating format conversion errors. Moreover, in the event the user wishes to save the custom report into a particular output format, such as WORD™ (Microsoft Corp., Redmond, Wash.), PDF, or other format to facilitate webpage display, such a conversion occurs only after the custom report has been generated, so that each source document portion is re-formatted at most only once. This approach thus tends to minimize reformatting errors by effectively preventing errors from being compounded by multiple format conversions such as may otherwise occur in the event a source document were converted to a common file format prior to report generation, and then re-formatted into a user-selected output format.

In a non-limiting, simplified example, an embodiment of the present invention may be used to build a report by selecting a portion of a page from a WORD (DOC) text file (which is identified as ID:3456), and a portion of a page of a PDF file (which is identified by page number and coordinates of the clipped section as PDF:p45{20,20:400,800}). The user may also select a table from an EXCEL® (Microsoft) file (in the XLS format, identified by worksheet and cell coordinates as XL:Sheet1{1,1:20,5}). This custom report may thus be stored as a sequence of these identifiers/references to the source material in its native format.

The user may then view the custom report online, and/or save it to a project (output) file, such as a WORD doc. In this latter instance, any source data not natively in the target (e.g., .doc) format, would be reformatted into .doc. Thus, in this example, the first selected portion would then be simply inserted as WORD text, image or table; the PDF section may be converted to an image and inserted as an image; and the EXCEL® excerpt would be inserted as a table in the final WORD doc. Each of these sections may include a reference link in the final WORD doc to permit the user to link to the original source content in its native format.

In addition, the foregoing architecture permits particular embodiments of the invention to conveniently provide for enhanced version control. Publishers often need to provide continuous updates to their reports, and would like their users to sign up for subscriptions to receive these updates, rather than simply make one-off purchases of reports. There are also many other applications, such as legal guidelines, etc., which would benefit from being able to compare different dates/versions of the same report, to see what's new, or to see which rules were in effect when a particular issue arose. The embodiments described herein enable reports to evolve with a virtually unlimited number of revisions. For example, when a new revision is uploaded, these embodiments do not simply save the full report, but rather, add the new sections. The old sections are also retained, with every section stored with a unique ID code, date and version. This allows the system to reconstruct the report as it was at any date, or to compare the versions at particular dates.

In particular embodiments, this version control may be used in connection with a user's subscription expiration, such as to allow users to continue to access the latest version of the custom report at the point their subscription expired. The publisher may then, for example, encourage those users to renew their subscriptions by providing them with a customized summary of the updates they would be able to access if they choose to renew.

Terminology

For the purposes of the present specification, the term "transaction" shall be taken to include any communications between two or more entities and shall be construed to include, but not be limited to, commercial transactions including data searching, aggregation, and presentation, including sale and purchase transactions. The terms "computer" and "end-user device" are meant to encompass a workstation, personal computer, personal digital assistant (PDA), wireless telephone, or any other suitable computing device including a processor, a computer readable medium upon which computer readable program code (including instructions and/or data) may be disposed, and a user interface. Terms such as "server", "application", "engine" and the like are intended to refer to a computer-related component, including hardware, software, and/or software in execution. For example, an engine may be, but is not limited to being, a process running on a processor, a processor including an object, an executable, a thread of execution, a program, and a computer. Moreover, the various components may be localized on one computer and/or distributed between two or more computers. The terms "real-time" and "on-demand" refer to sensing and responding to external events nearly simultaneously (e.g., within milliseconds or microseconds) with their occurrence, or without intentional delay, given the processing limitations of the system and the time required to accurately respond to the inputs. Terms such as "component," "module", and the like are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server (or control related devices) can be components. One or more components may reside within a process and/or thread of execution and a component may be localized on one computer and/or distributed between two or more computers or control devices.

Programming Languages

The system and method embodying the present invention can be programmed in any suitable language and technology, such as, but not limited to: C++; Visual Basic; Java; VBScript; Jscript; BCMAscript; DHTM1; XML and CGI. Alternative versions may be developed using other programming languages including, Hypertext Markup Language (HTML), Active ServerPages (ASP) and Javascript. Any suitable database technology can be employed, such as, but not limited to, Microsoft SQL Server or IBM AS 400.

Transaction Facility

FIG. 1 is a block diagram illustrating an exemplary network-based transaction facility in the form of an Internet-based report generation facility 10. The report generation facility 10 includes one or more of a number of types of front-end servers, namely page servers 12 that deliver web pages (e.g., markup language reports), picture servers 14 that dynamically deliver images to be displayed within Web pages, CGI (Common Gateway Interface) servers 18 that provide an intelligent interface to the back-end of facility 10, and search servers 20 that handle search requests to the facility 10. E-mail servers 21 provide, inter alia, automated e-mail communications to users of the facility 10. The back-end servers may include a database engine server 22, a search index server 24 and a payment (e.g., credit card and/or subscription) database server 26, each of which may maintain and facilitate access to a respective database. Facility 10 may also include an administrative application server 28 configured to provide various administrative functions.

The network-based report generation facility 10 may be accessed by a client program 30, such as a browser (e.g., the INTERNET EXPLORER® distributed by Microsoft) that executes on a client machine 32 and accesses the facility 10 via a network such as, for example, the Internet 34. Other examples of networks that a client may utilize to access the report generation facility 10 include a wide area network (WAN), a local area network (LAN), a wireless network (e.g., a cellular network), or the Plain Old Telephone Service (POTS) network.

Database Structure

Figure 2:
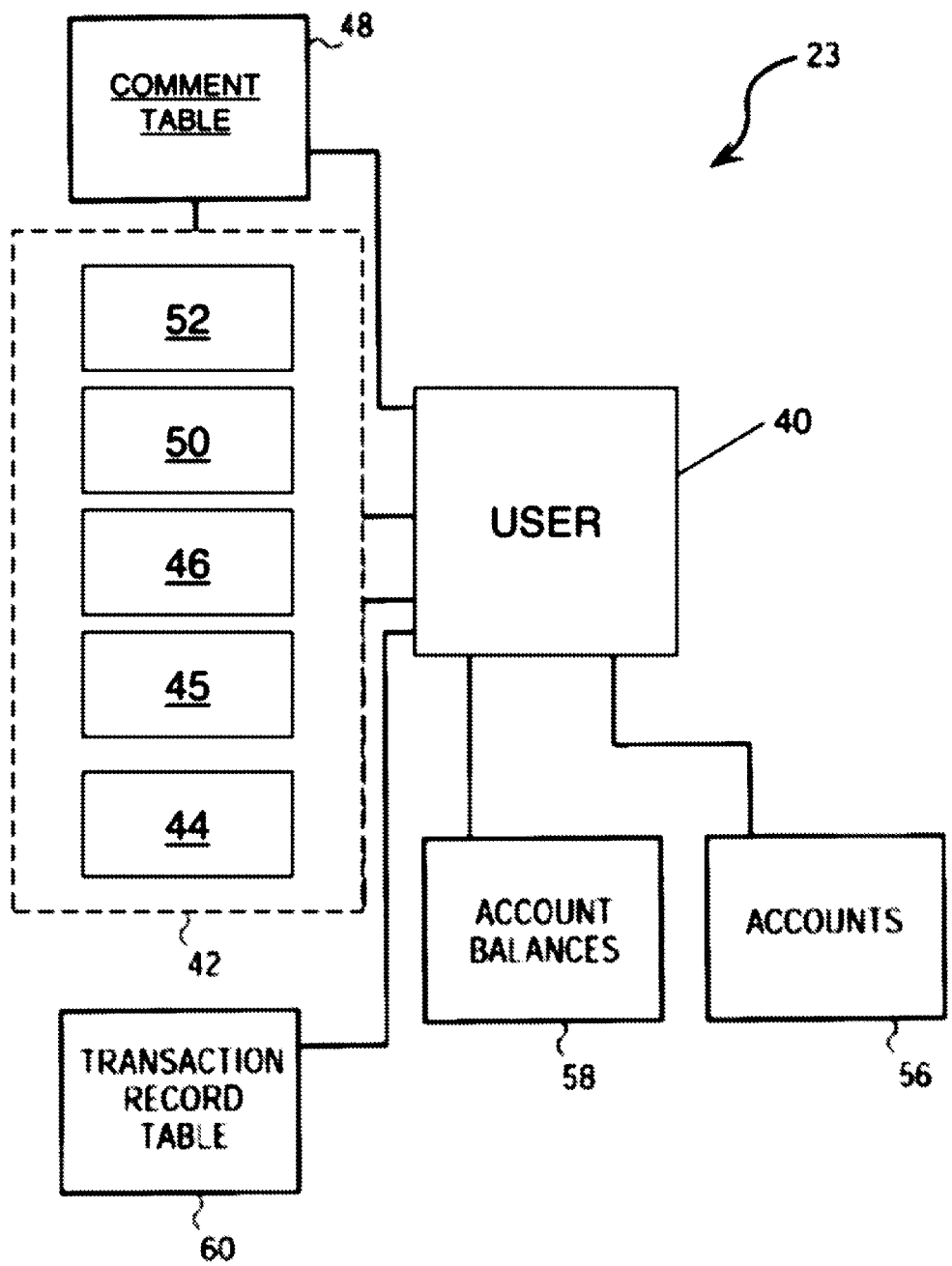
FIG. 2 is a block diagram of one embodiment of a database maintained by a database engine server of the embodiment of the present invention.

FIG. 2 is a database diagram illustrating an exemplary database 23, maintained by and accessed via the database engine server 22, which at least partially implements and supports the report generation facility 10. The database 23 may, in one embodiment, be implemented as a relational database, and includes a number of tables having entries, or records, that are linked by indices and keys. In an alternative embodiment, the database 23 may be implemented as collection of objects in an object-oriented database.

As shown, central to the database 23 is a user table 40, which contains a record for each user of the report generation facility 10. The database 23 also includes tables 42 that may be linked to the user table 40. Specifically, the tables 42 may include source material (e.g., source document) content table 44, archive table 45, translation table 46, custom report tables 50 and 51, and version table 52. A user record in the user table 40 may be linked to multiple reports that are being, or have been, generated via the facility 10 and for which records exist within the report tables 42. The database 23 also includes a comment table 48 populatable with comment records that may be linked to one or more report records within the report tables 42 and/or to one or more user records within the user table 40. Each comment record within the table 48 may include, inter alia, a comment, description, history or other information pertaining to a report being generated via the report generation facility 10. A number of other tables may also be linked to the user table 40, such as an accounts table 56, an account balances table 58 and a transaction record table 60.

FIG. 3 is a diagrammatic representation of an exemplary embodiment of the user table 40 that is populated with records, or entries, for each user of the report generation facility 10. As shown, table 40 includes a user identifier column 61 that stores a unique identifier for each user. A name column 63 may store a first name, a middle initial and a last name for each user. An address column 65 may store full address information and/or other contact information for each user, e.g. a street name and number, city, zip code, state, email address, etc. A phone number column 67 stores a home phone number for each user. A subscription status column 69 may store, for each user, a value identifying the user's subscription status. That is, different values may be assigned to indicate whether a user has a currently valid subscription, has an expired subscription (and which provides limited access to facility 10), and/or is accessing the facility on a pay-as-you-go basis such as via credit card, etc. It will be appreciated that any information other than that described above may populate the user table 40 without loss of generality.

Figure 4A:
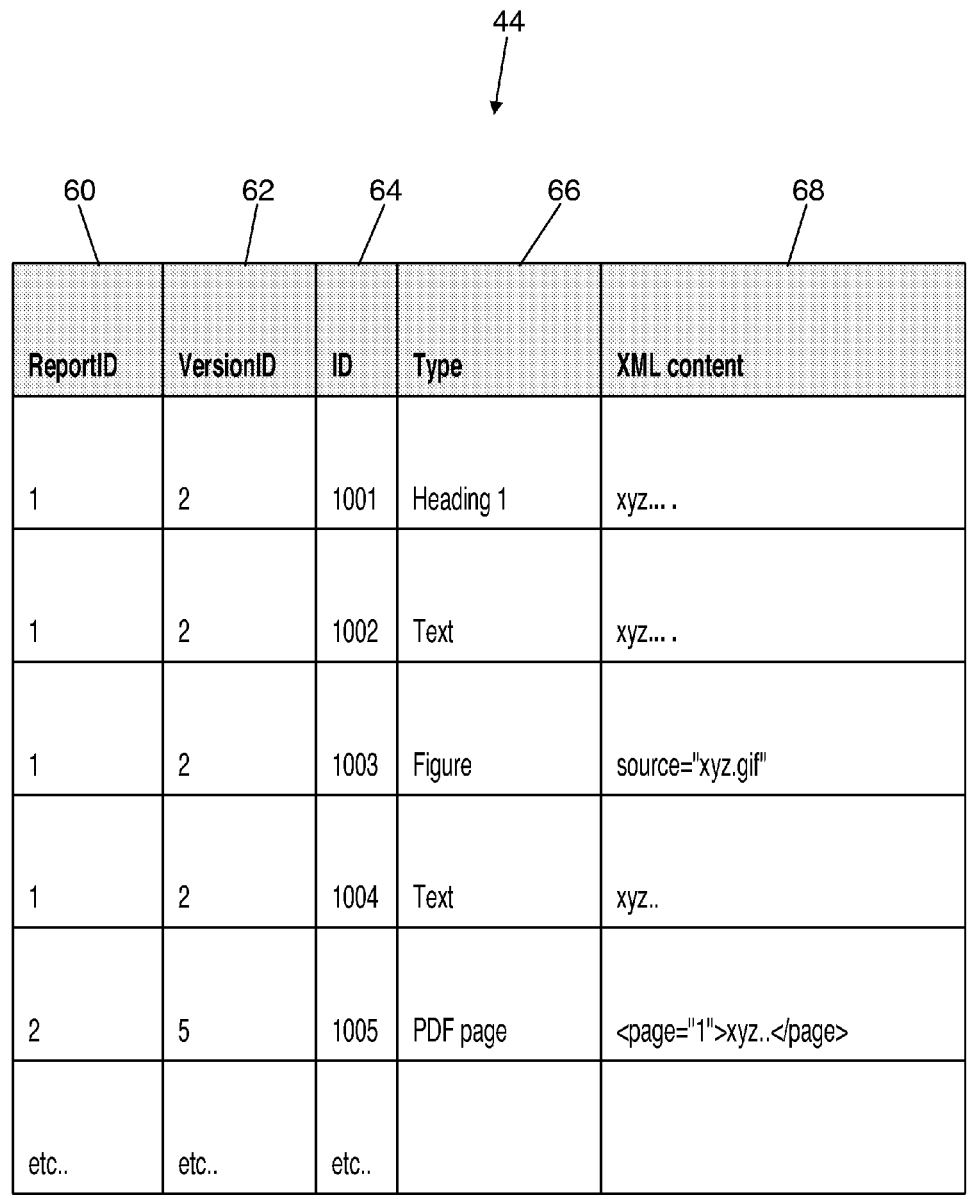

FIGS. 4A-4F are diagrammatic representations of exemplary embodiments of tables 44, 45, 46, 48, 50, 51 and 52 which are populated with document/report records during use of the report generation facility 10. Referring now to FIG. 4A, source material (document) table 44 is configured to store the content of source documents. This table includes a report ID column 60 to identify the particular source document, a Version ID column 62 to track versions, an ID column 64 to provide a unique reference to each section of the document, a Type column 66 which provides the section type, such as text, heading, table, figure etc. for each section. For extended file types, such as PDF, etc., this column may be used to provide the file type. Content column 68 is populated with the actual content (e.g., XML) of the particular section. Any text capable of being extracted from particular file types such as PDF/PPT/XLS, i.e., from the particular page/slide/worksheet, respectively, is maintained in this column 68 for use by the search and translate functions, etc., as will be described in greater detail hereinbelow. This Content column 68 may also include variables to further define the source of the section content, including author, publisher, publication dates, copyright notices and terms of use.

Figure 4B:
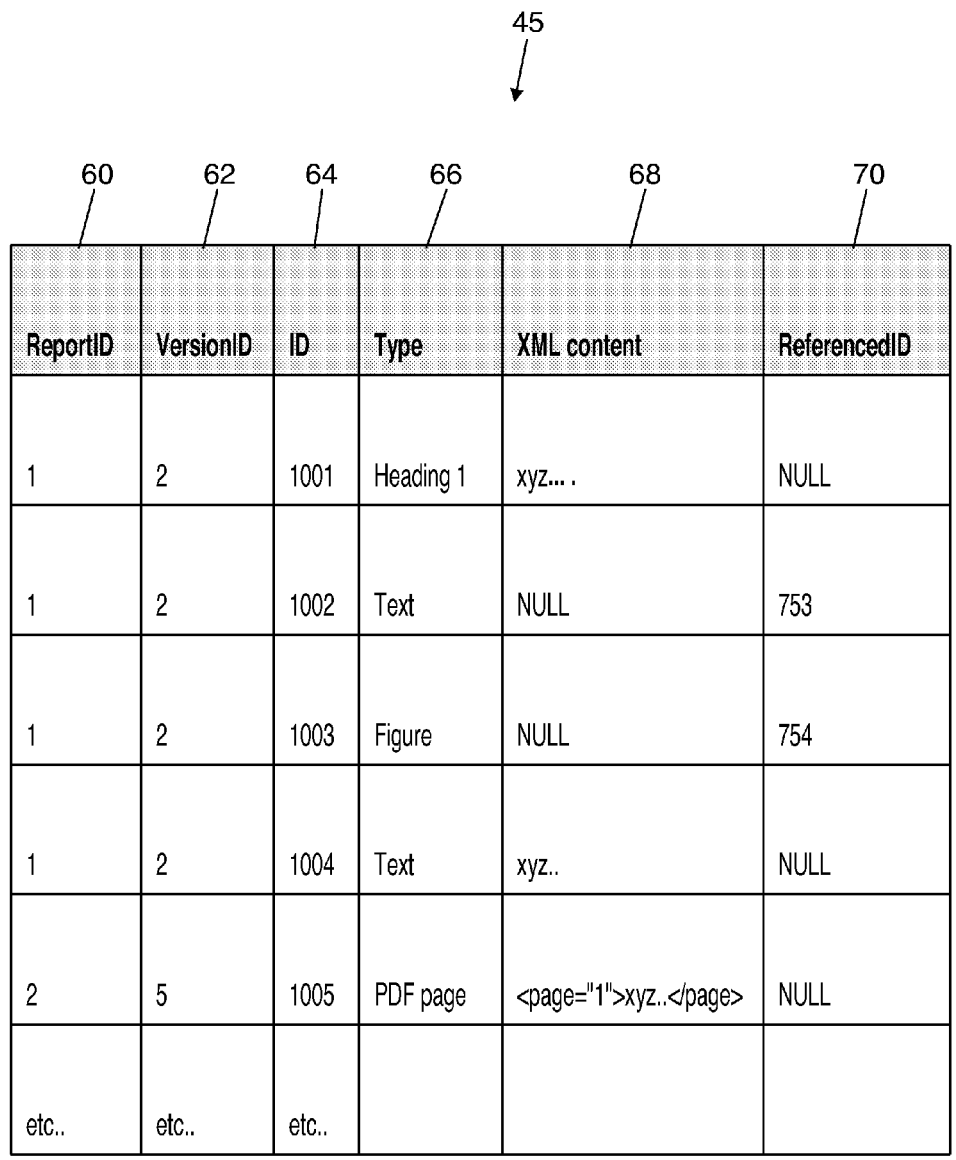

Turning now to FIG. 4B, content archive table 45 enables the system to track multiple versions of the same document. This table 45 is substantially similar to content table 44, except that a ReferencedID column 70 is added, and content column 68 may be populated as NULL, in which case the ReferencedID column 70 maps to a previous entry with a non-null (e.g., XML) content. So in the event the (XML) content is unchanged relative to a previous version, column 70 is populated with the ID (from column 64) of the previous version of the particular section. The content archive table can be used to restore prior versions of a report, by retrieving all the XML content for that ReportID and VersionID. Where the XML content is NULL, this means it's unchanged from previous versions, and the system 10 uses the ReferencedID to identify the original text in an older version.

Figure 4C:
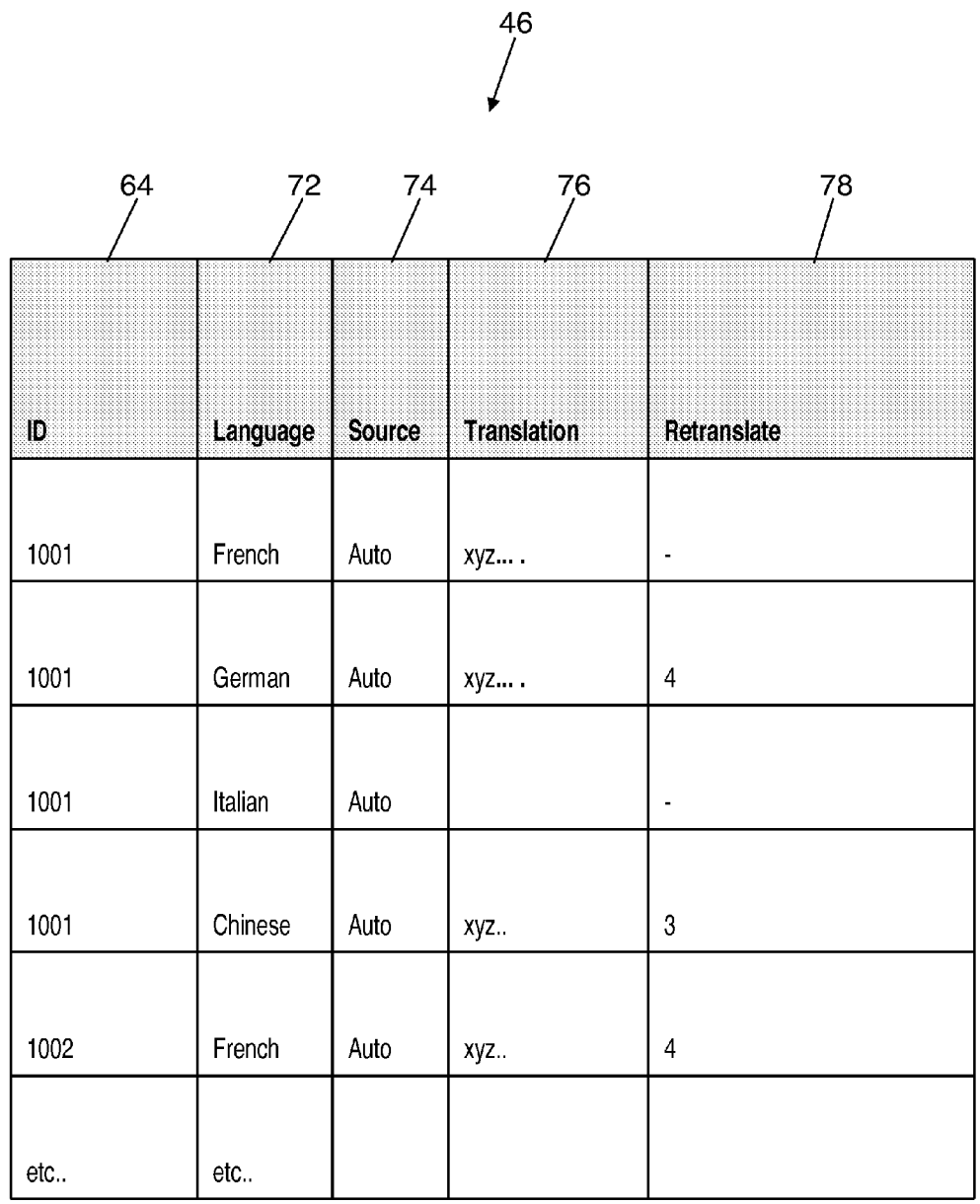

As shown in FIG. 4C, the translation table 46 is used to store the content that has been translated into foreign languages. This table includes an ID column 64, a language column 72 to identify the particular language of the translated section, and a translation source column 74. Column 74 is used to track the translator, such as for quality control and/or to facilitate the upgrade of machine translated text to human-translated text. A translation column 76 is populated with the translated content, and the retranslate column 78 may be populated by a user to flag text that may have been poorly translated, for re-translation by a professional.

Figure 4D:
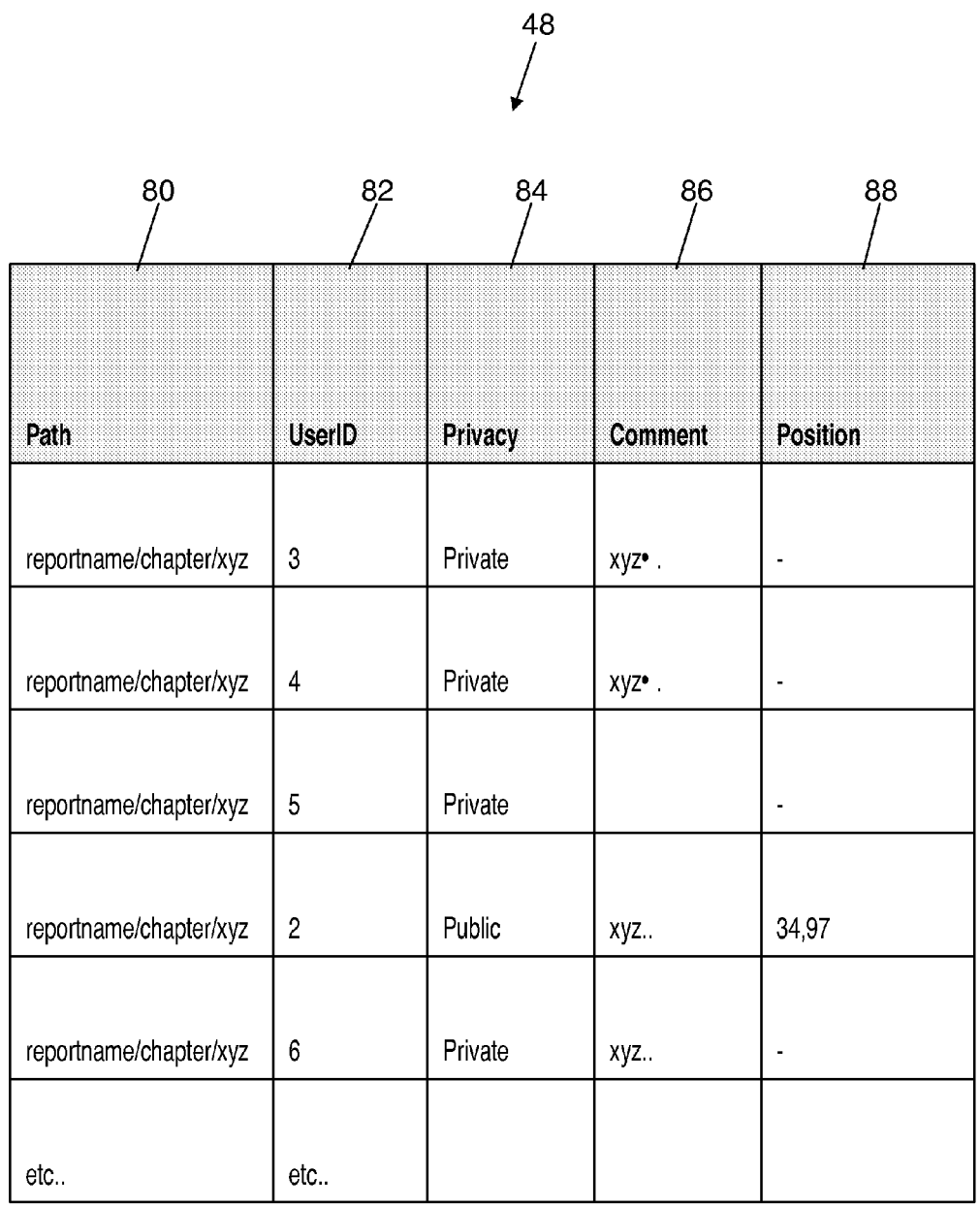

Referring to FIG. 4D, the comments table 48, as mentioned above, may be used to retain users' comments on particular sections of documents. Table 48 includes a path column 80 which, instead of using an ID 64 to link to the content table 44, is populated with a path of heading titles (e.g., filenames) to point to the correct section. Although IDs 64 may be used to point the comments, use of the heading title paths effectively sticks the comments to sections even in the event IDs change in a revised document. (In this regard, IDs 64 may be created automatically by the database as new rows are inserted in the various tables. If a document is updated then original content may be removed after the new content has been inserted and the differences tracked, as discussed hereinabove. Thus, the IDs 64 for material used in a particular section may change, which illustrates the advantage of using heading title paths to link comments to a particular section.) UserID column 82 is used to identify the user who inserted a particular comment. Privacy column 84 is used to identify the scope of the comment, e.g., for private use, company-wide use, or public use. Comment column 86 is used to store the text of the actual comment. Position column 88 may be used to facilitate use in connection with extended file formats such as PDF, PPT, XLS, etc. This column 88 may thus be used to retain the co-ordinates of where the user inserted the comment on the particular page, slide, worksheet, etc.

Figure 4E:
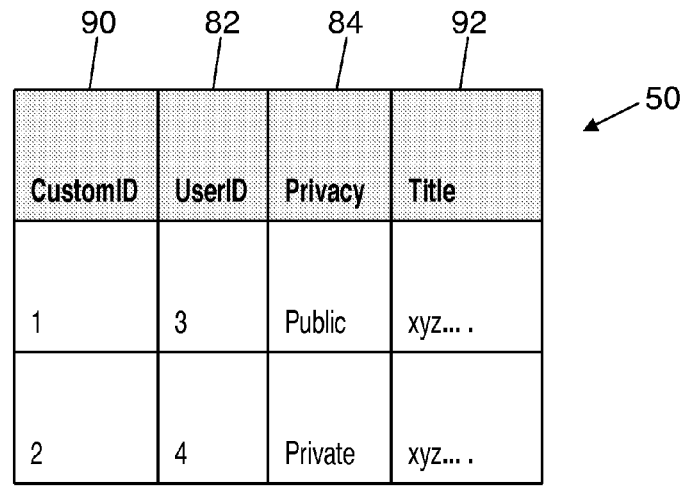
Figure 4F:
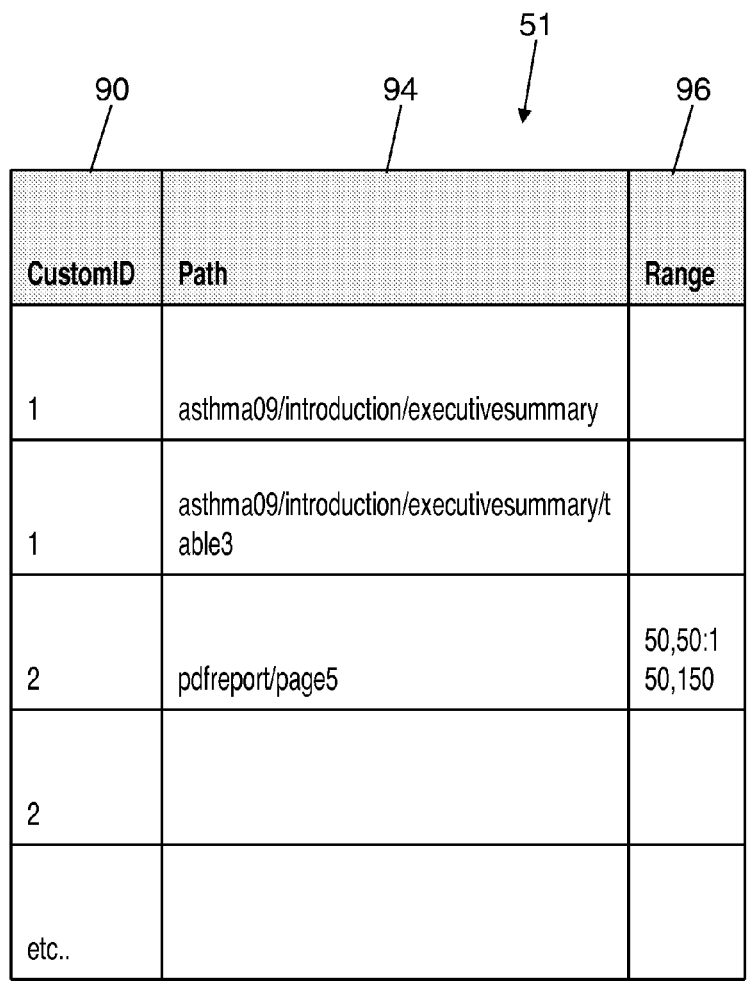

Custom report tables 50 and 51, as shown in FIGS. 4E and 4F, allow users to rearrange document content into their own customized reports. Table 50 includes a CustomID column 90 which is populated with the ID of the particular user-generated custom report. UserID and Privacy columns 82 and 84 are provided as described above. Title column 92 identifies the title of the custom report.

Custom report table 51 is a custom detail table which includes a Path column 94 used to provide a pointer to each particular section (e.g., to the particular location in the table storing the selected content) used in the custom report. Note that in the example shown, Path column 94 stores a pointer in the form of a file path to the particular section of interest. However, any suitable pointer may be used, including for example, the section ID 64 of table 44. A Range column 96 is used to facilitate use of content in extended file formats such as PDF, PPT, XLS, etc., to retain the co-ordinates of the selected content on the particular page, slide, worksheet, etc. As shown, this is usually a range defining the top left and the bottom right coordinates of a rectangle bordering the selection.

As shown in FIG. 4G, version table 52 is used to map version numbers to particular dates in time. Table 52 includes a ReportID column 60, a VersionNumber column 97, a Date column 98, and an UploadedByUserID column 99.

Report Generation Process

As mentioned hereinabove, embodiments of the present invention provide an automated system and method for generating reports from source documents of various types/formats, including text (e.g., DOC), image, PDF, PPT, XLS, and other formats. These embodiments enable such report generation in a real-time, web-based, client-server environment, such as on a subscription or pay-as-you-go basis. While the present invention is discussed within the environment of the exemplary report generation facility 10, it will readily be appreciated that the present invention may be used in any number of environments including network and on-line based transaction facilities in business-to-business, business-to-consumer and consumer-to-consumer applications.

Figure 5:
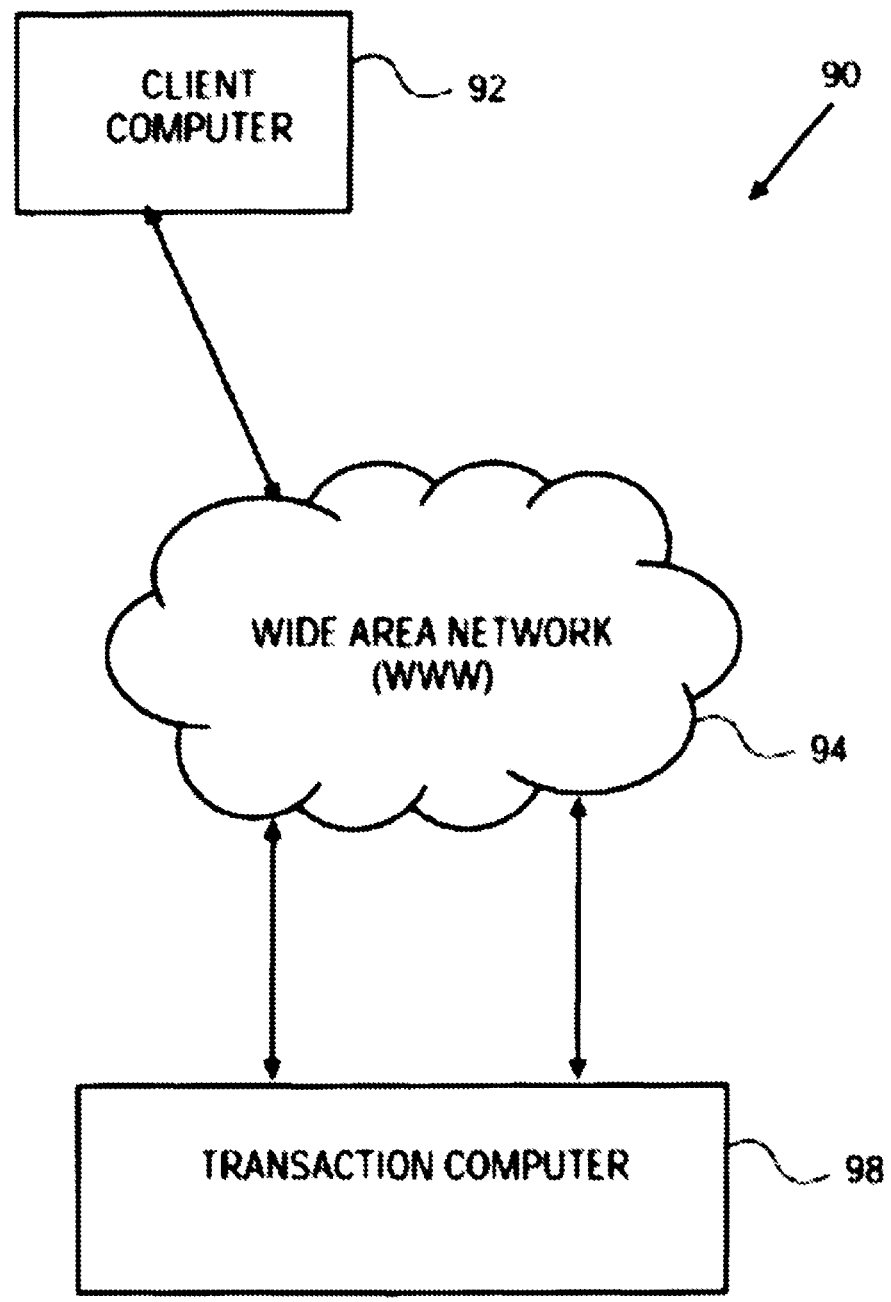
FIG. 5 is a simplified block diagram of one embodiment of a system of the present invention including a transaction facility.

FIG. 5 is a simplified block diagram of a system 90 for generating reports in accordance with an exemplary embodiment of the present invention. In this embodiment, a client computer 92 is coupled to a transaction computer 98 via a communications network (e.g. a wide area network) 94. The client computer 92 represents a device that allows a user to interact with the report generation facility 10 or any other transaction facility 98. In one embodiment, the client computer 92 presents to the user a report generation interface for searching and aggregating content within one or more libraries of source documents associated with the transaction computer 98.

The transaction computer 98, which supports a report generation facility such as shown at 10 of FIG. 1, handles transactions between various participants of the facility 10 including the user of the client computer 92. In one embodiment, the transaction computer 98 may initially receive the personal information of the participant from the client computer 92, and generate a subscription result which determines whether, and to what extent, the user is granted access to the facility 10. The transaction computer then facilitates the generation of custom reports in accordance with various user interfaces presented by the computer 98, via the client computer 92, to the user.

Figure 6:
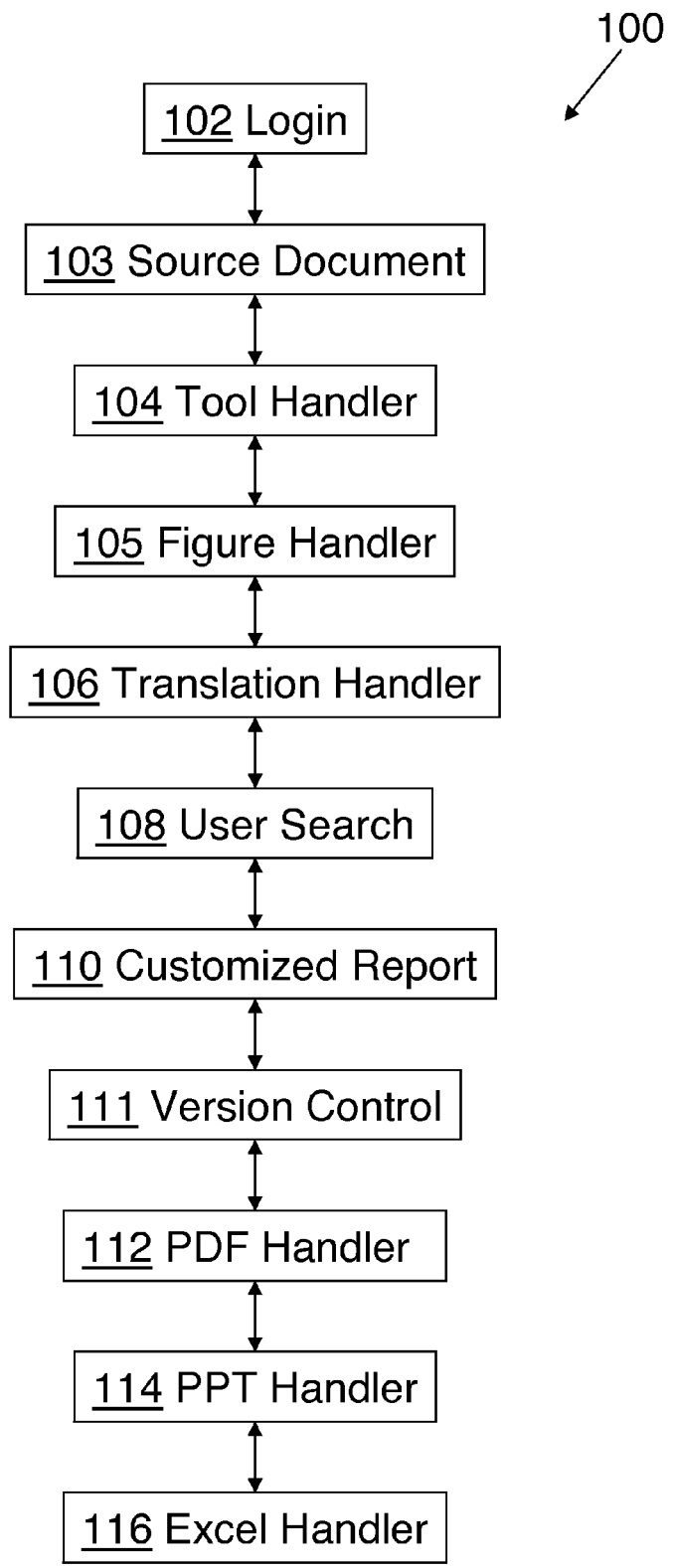
FIG. 6 is a functional block diagram of objects within an embodiment of a transaction facility of the present invention.

FIG. 6 shows a series 100 of interfaces/modules, such as may take the form of a series of objects (or methods), that may be implemented by the report generation facility 10, e.g., in combination with the various tables of database 23, for the purposes of generating one or more custom reports. The series 100 of interface modules shown in FIG. 6 will be described with reference to exemplary representations of the various interfaces as shown in FIGS. 8-11.

As shown, series 100 includes a login module 102, configured to generate a login interface through which a user of the facility 10 provides at least a user identifier and associated password. The user may also be requested to pay a fee for the subscription process.

A source document module 103 is configured to generate a source document interface, such as shown at 200 in FIG. 8. Module 103 interacts with the various tables of database 23 (FIG. 1) to enable interface 200 to display various source documents in an interactive format. In particular, a collapsible document tree 202 is provided to enable a user to open sections, or to highlight the location of search matches. Function tabs 204 are provided to search within the document, extract the figures, tables, compare sections with split screen, translate or 'cut your own' personal report. A toolbox 206, generated by a tool handler 104, is provided for operations involving the currently displayed content—e.g. extract to WORD™, POWERPOINT® (Microsoft), EXCEL®, prepare a printer friendly version, or email it to a colleague. Within the displayed document, interface 200 provides function buttons 208, also via tool handler 104, to copy individual sections (e.g., to the user's personal library) or to add comments that can be shared with other users. In particular embodiments, source document module 103 and interface 200 are configured to handle source documents in text file formats, such as DOC or ASCII, etc., while source documents in other formats, such as images (figures), XLS, PPT, PDF, etc., may be handled in conjunction with other modules, such as handlers 105, 112, 114 and 116, as discussed hereinbelow.

Figure 9:
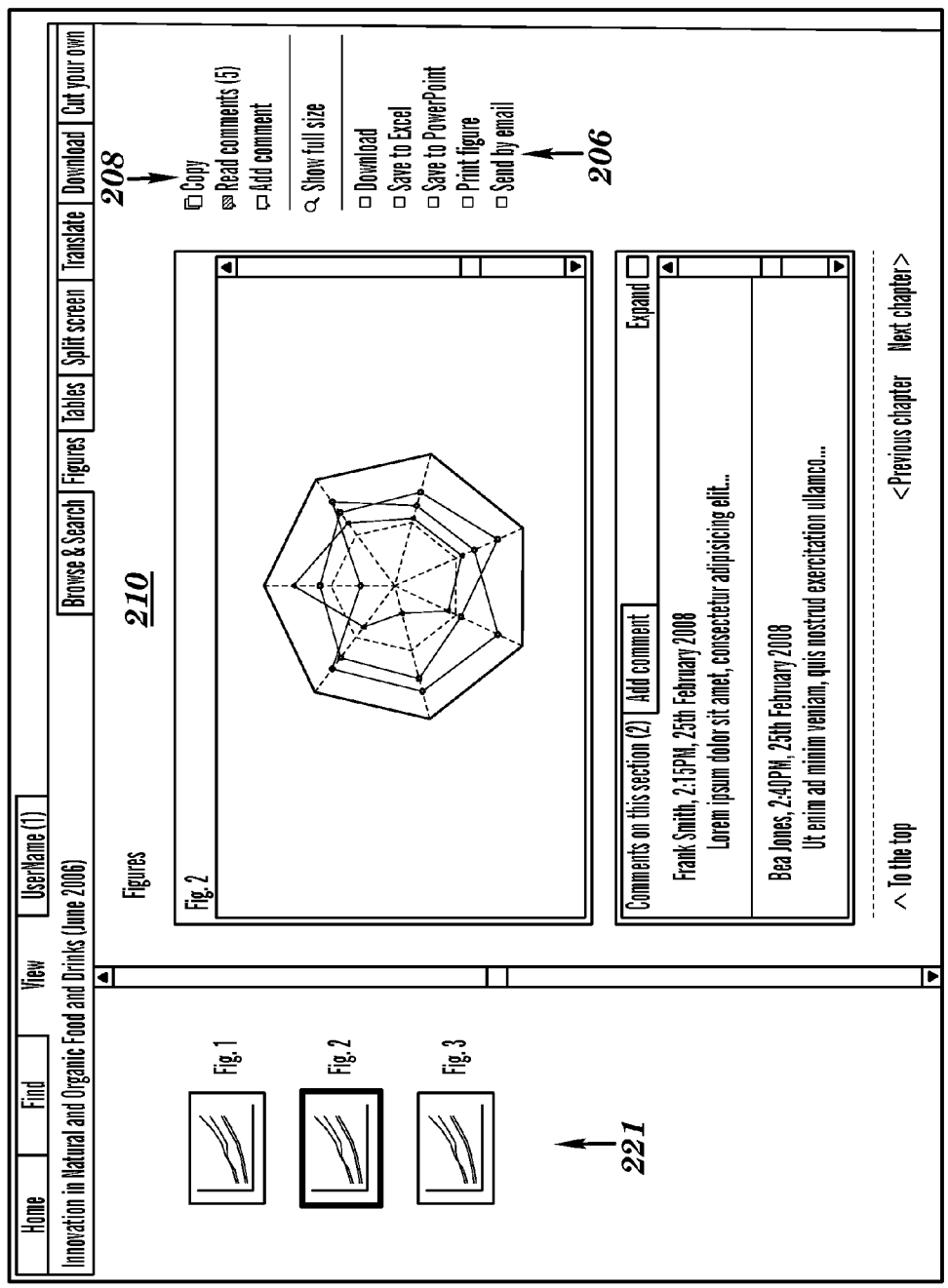

Returning to FIG. 6, figure handler 105 is configured to generate a figure interface such as shown at 210 of FIG. 9. This exemplary figure interface 210 illustrates how the storage format of the various tables facilitates flexible reproduction of the original document. In the example shown, the user is only interested in figures, so the system, via interface 210 has identified all the figures within a particular source document, e.g., shown in thumbnail form at 221, with the highlighted thumbnail shown enlarged in the center of the interface 210. As with all of the user interfaces shown and described herein, toolbox 206 and buttons 208 are provided, via tool handler 104, to enable the user to comment on figures, or save to Office or the user's own online personal library etc.

Translation handler 106 is configured to generate a translation interface such as shown at 212 of FIG. 10. Translation handler 106 operates in conjunction with the aforementioned translation table 46 to display foreign translations, e.g., side-by-side with the corresponding sections of the source document, as shown. It is noted that handler 106 checks for a copy of the translated section in the database 23. If the translation is not found, then the system requests the section be translated from an external translation service. In particular embodiments, this happens in real time and the translation interface 212 displays a please wait icon to the user. The translation for each section may be displayed as soon as it's received from the external system. The translated section may then be saved in the database 23, so that the translation will be shown immediately if the same translation is requested by another user in the future.

User search module 108 is configured to generate a search interface, such as shown at 214 in FIG. 11. The document storage format embodied in the various tables described above, enables the search module 108 to implement a relatively precise search, based on keywords entered via this interface 214. As shown, search results are displayed, including relevant sections within a document. The interface 214 may then directly access the relevant sections by highlighting and using toolbox 206.

Figure 12:
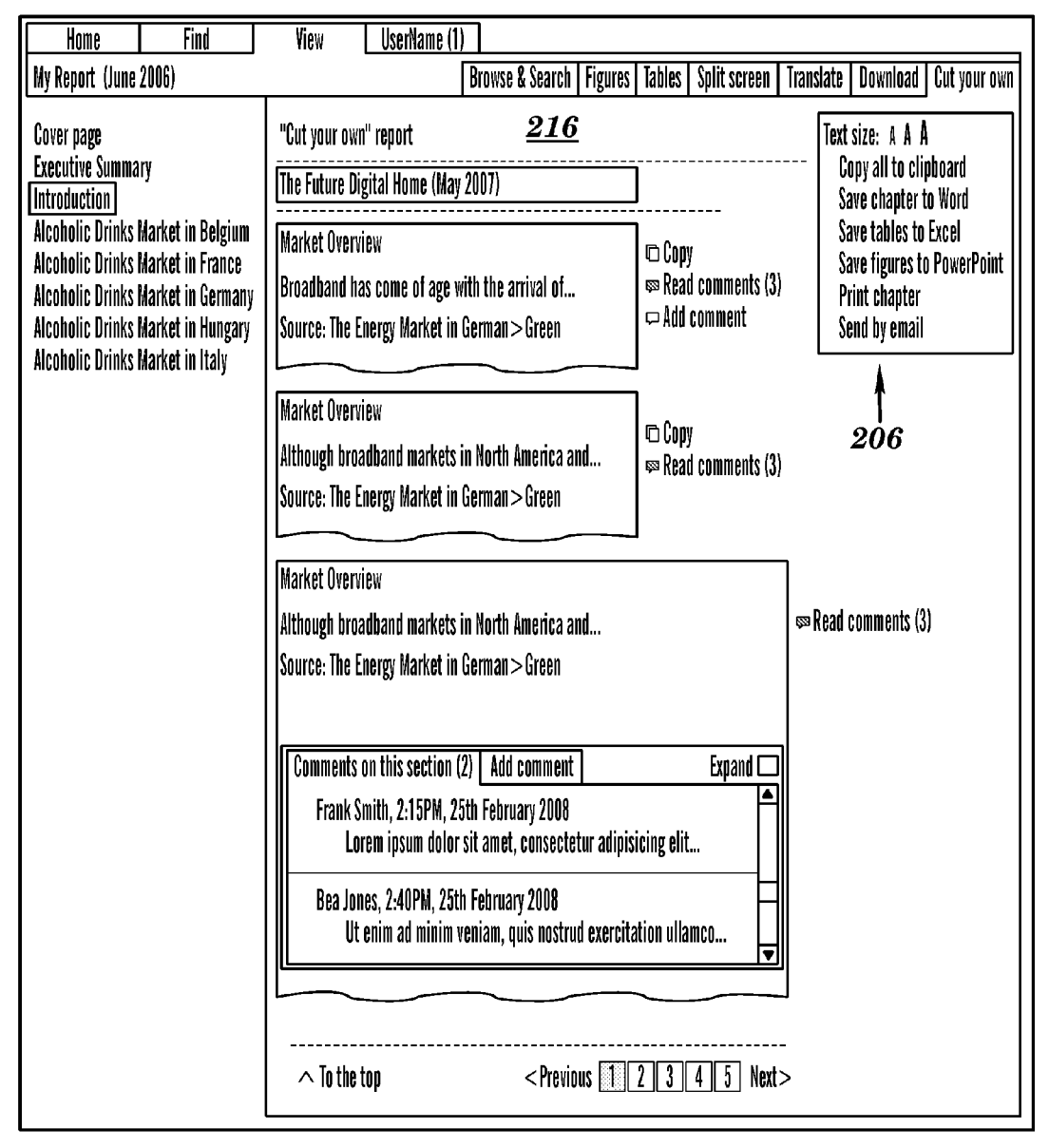

The custom report module 110 is configured to generate a custom report interface such as shown at 216 of FIG. 12. As shown, the sections selected via the various interfaces shown and described herein, may be displayed by this custom report interface 216. This interface thus displays the user's custom report, which includes the various sections copied from the aforementioned source documents. In the particular embodiment shown, the personal report is presented with 'page tear' graphics to differentiate the sections obtained from different source documents. The source information for the original source document and/or section, as tracked in the aforementioned tables, is also displayed. In addition to tracking the source information for the source document/section, custom report module 110 also includes a version control module 111. The version control table 111 uses the aforementioned version tables to enable a user, e.g., via interface 216, to display particular versions of a custom report.

It is noted that this custom report interface 216 also enables the user to perform the same functions with this custom report, as they can perform with the various source documents, such as add comments, translate, copy sections and share with colleagues, etc.

Figure 13:
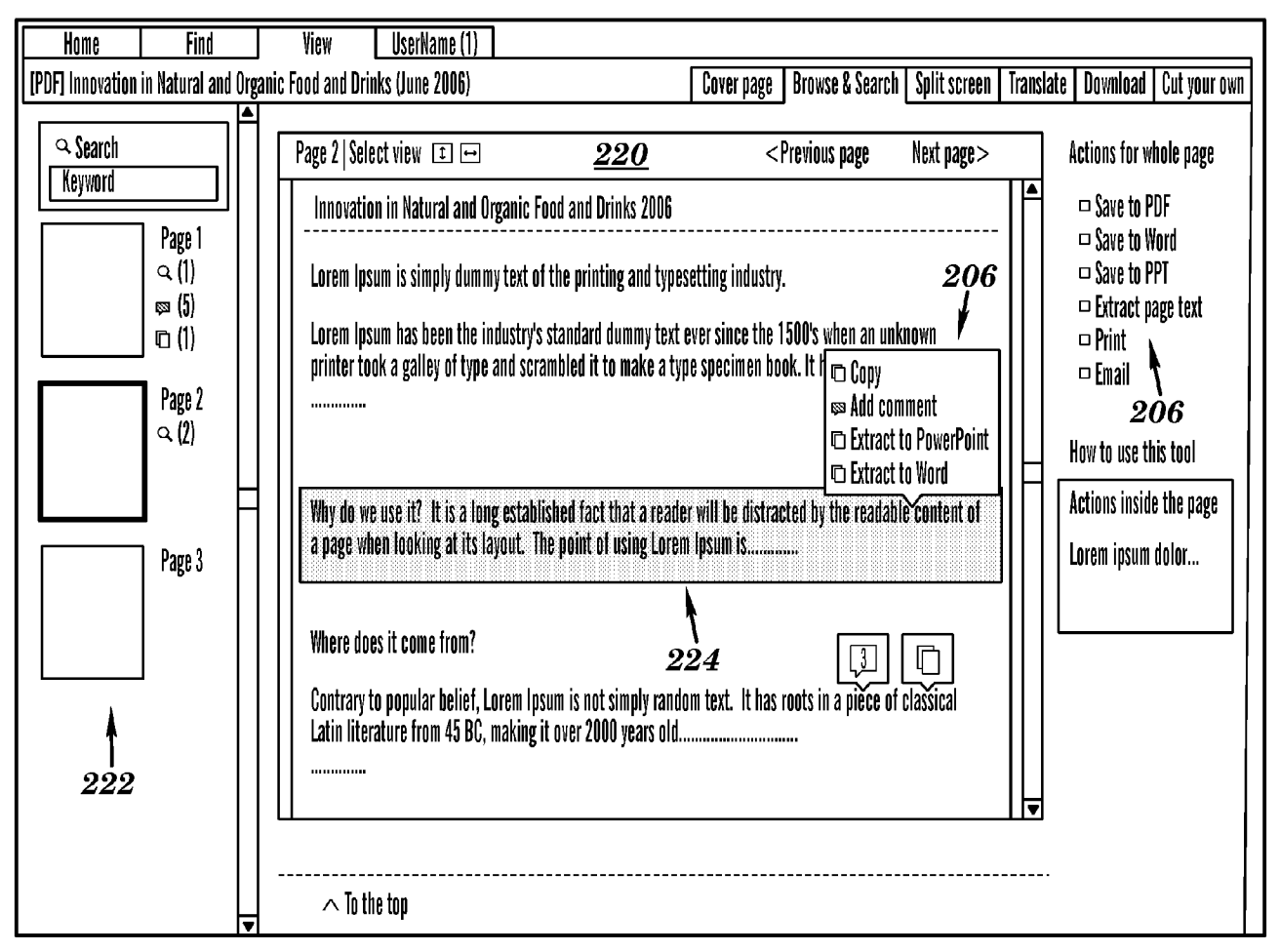

PDF Handler 112 is configured to generate a PDF Handler interface, such as shown at 220 in FIG. 13. The PDF Handler 112 splits PDF documents into pages 222, and saves each separately as: (i) a high resolution image; (ii) a single page PDF; and through the use of conventional text extraction and/or optical character recognition tools, (iii) text in the aforementioned database tables. This enables the PDF content to be viewed and used in similar ways to the other documents on the system. In particular, the search module 108 may use the text in the database to present matches that link to the relevant page within a PDF document. The page text stored in the database tables may also be accessed by the toolbox 206 when the user seeks to extract the text to other (e.g.,MICROSOFT OFFICE™) formats and/or translation. Other capabilities include enabling the user to comment on individual pages as described above. In addition, the high resolution image may be resized and inserted into the users' online personal reports and Office documents. The individual PDF pages may also be assembled when the user wants to save multiple pages to a new PDF file.

It is noted that the foregoing functionality, while providing for such capability as text extraction and manipulation, still provides for maintaining and using PDF files in their native format. In this regard, PDF Handler 112 is configured to permit the user, via interface 220, to draw a rectangle 224 to select page sections they would like to use (e.g., operate extraction functions on). This rectangle may then be manipulated (e.g., extracted to MICROSOFT OFFICE™ files), using toolbox 206 as shown. In this regard, PDF Handler 112 will capture and populate the coordinates of the rectangle(s), along with the filename of the image (or PDF file), to the table(s) of database 23. Thus, when saving to the user's personal library, only the co-ordinates and the image filename need to be stored in the tables.

Figure 14:
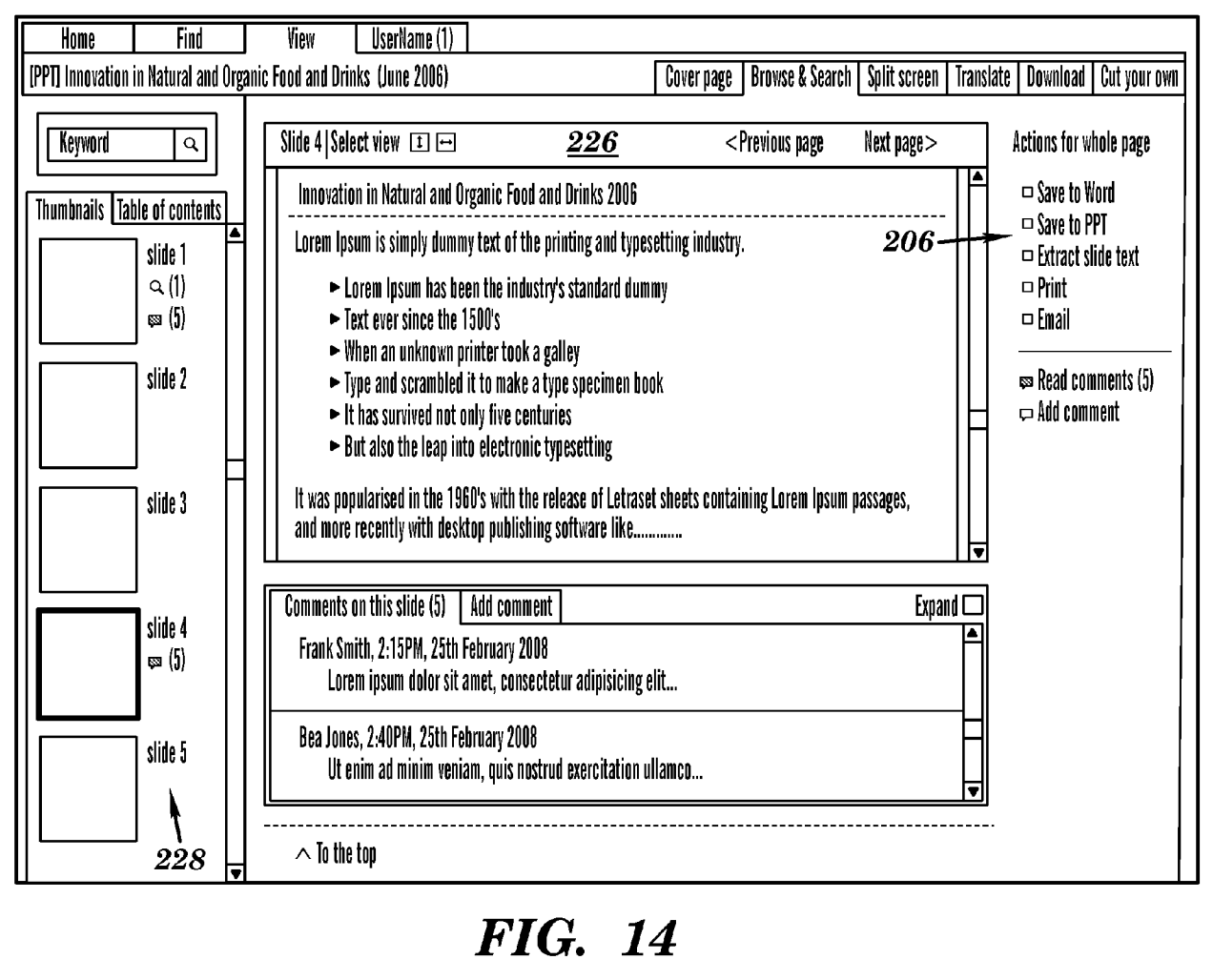

PPT Handler 114 is configured to generate a PPT Handler interface, such as shown at 226 in FIG. 14. As shown, POWERPOINT® (Microsoft) files are integrated in much the same way as PDFs, except that each slide 228 of the PPT files (rather than each page of the PDF files) are saved as individual PPT files (rather than as PDF files).

Figure 15:
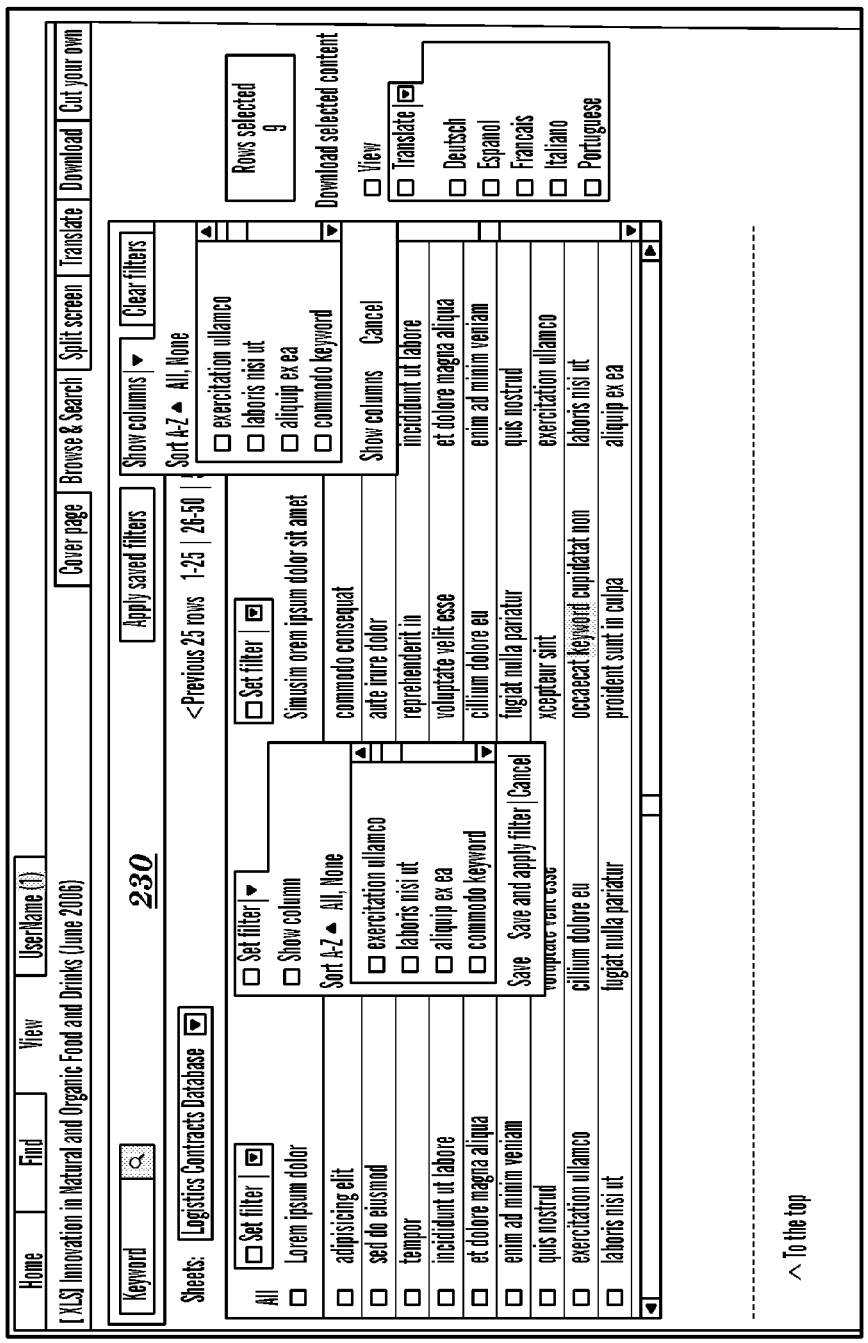

EXCEL® (XL) Handler 116 is configured to generate an EXCEL® (XL) Handler interface, such as shown at 230 of FIG. 15. As shown, handler 116 provides a mechanism, via interface 230, in combination with the tables (e.g., table 51) of database 23, for saving XL files and integrating these with the substantially the same search, personal library, translation and 'save to Office' functions as described above for documents in other formats. The interface 230 also provides mechanisms to filter the table content and save these views to the personal library, etc.

Figure 7A:
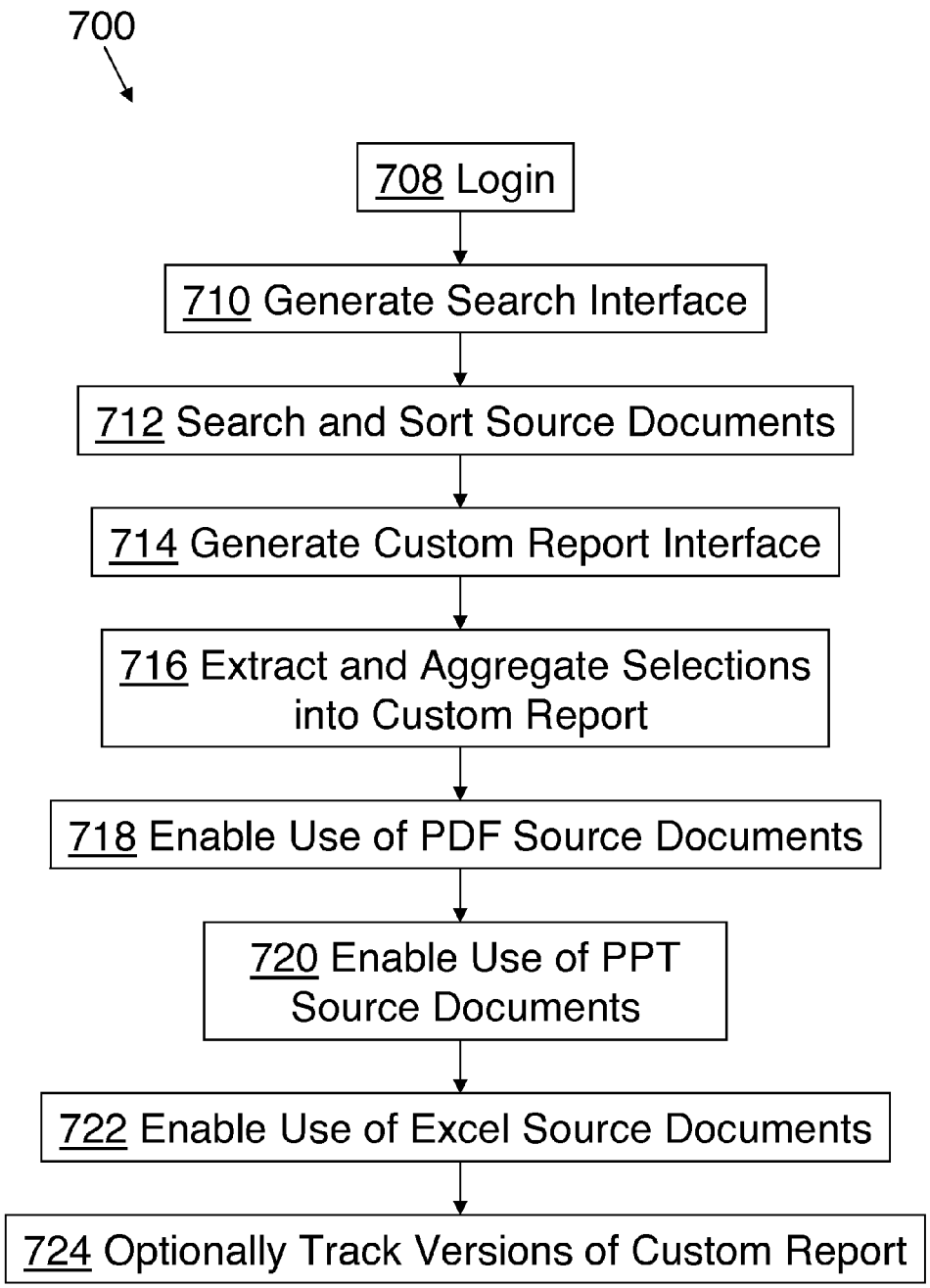
FIG. 7A is a flow chart of one embodiment of a method of present invention.

A method for automated document research, aggregation, and compilation, in a client-server environment, using a network-based transaction facility, such as the report generation facility 10, will now be described as illustrated by the flow chart of FIGS. 7A and 7B. As shown in FIG. 7A, the method 700 commences with communicating 708 user interface information to a user of the transaction facility at client 32 (FIG. 1). More specifically, the user interface information may provide a login interface via login module 102, described above with reference to FIG. 6.

Subsequent to the login by the user, at 710 the user is provided with a search interface, such as shown and described with respect to FIG. 8. At 712, in response to instructions received via the search interface, the facility 10 searches and sorts selections of interest within a plurality of source documents. At 714, the facility generates a custom report interface displayable to the client. At 716, in response to user selection instructions received via the custom report interface, the facility extracts and aggregates the selections of interest into a customized report. As may be required in response to the user selection instructions, at 718, the facility enables documents in the PDF format to be searched, sorted, extracted and aggregated into the customized report. At 720 and 722, the facility provides similar functionality for documents in the PPT and XLS formats, respectively. At 724, the facility 10 optionally tracks and outputs various versions of the custom report.

Figure 7B:
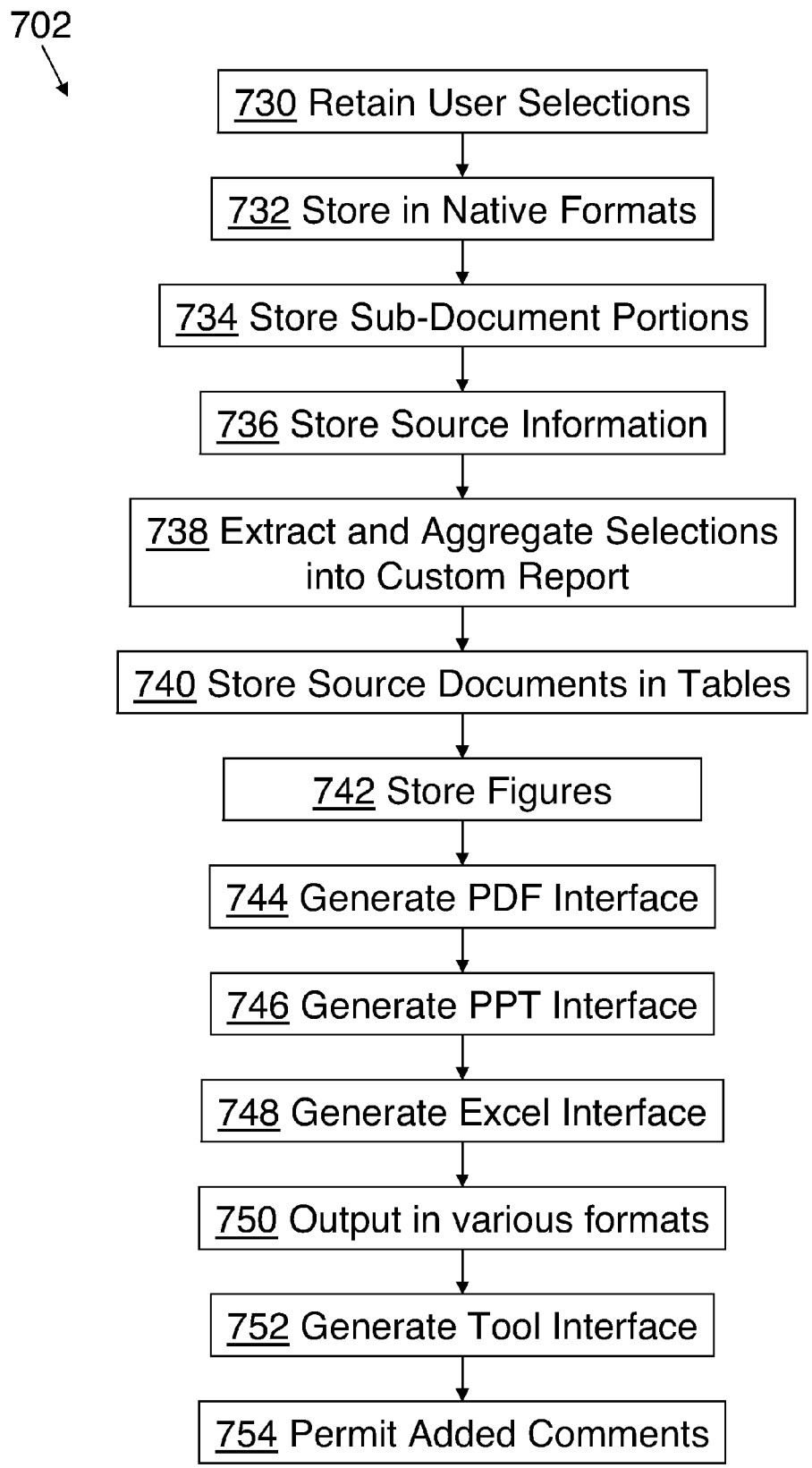
FIG. 7B is a flow chart of optional aspects of the embodiment of FIG. 7A.

Turning now to FIG. 7B, various optional steps shown as method 702 include retaining 730 the user selection instructions in order to regenerate the desired version of the custom report. At 732, the facility stores and indexes a plurality of source documents in a plurality of native formats including text (e.g., DOC or XML), PDF, PPT, and XLS. (It is noted that this step 732 may be effected independently of any particular user selection instructions, and typically occurs prior thereto, for an entire library of source documents.) At 734, the facility stores each of the plurality of source documents in a plurality of sub-document portions. At 736, source information is stored for each of the plurality of sub-document portions. At 738, the stored source information may include the author, publisher, publication date, copyright notice, and terms of use of the sub-document portions. At 740, the facility stores the plurality of source documents in one or more tables populated with the sub-document portions, source information, and with coordinate information for location of the sub-document portions within its source document. Figures are stored as sub-document portions of the source document at 742. At 744, 746 and 748, the facility respectively generates PDF, PPT, and XLS interfaces, for capturing user selection instructions associated with searching and sorting source document selections of interest in these formats. At 750, the facility outputs the custom report in any of a plurality of formats, such as XML, DOC, PDF, PPT, XLS, and substantially any other desired format. In this regard, the various embodiments of the invention are not limited to the particular formats shown and described herein, but rather, the embodiments shown and described herein may be used with substantially any file formats without departing from the scope of the invention. The facility generates, at 752, a tool interface displayable to the client for capturing user comments to be linked to individual sub-document portions. At 754, the tool interface permits a plurality of users to add comments to the custom report.

In summary, it will be appreciated that the above described interfaces, and underlying technologies, provide a convenient vehicle for document research, aggregation, and compilation, in a real-time, multi-user collaborative environment using a seamlessly integrated transaction facility.

Figure 16:
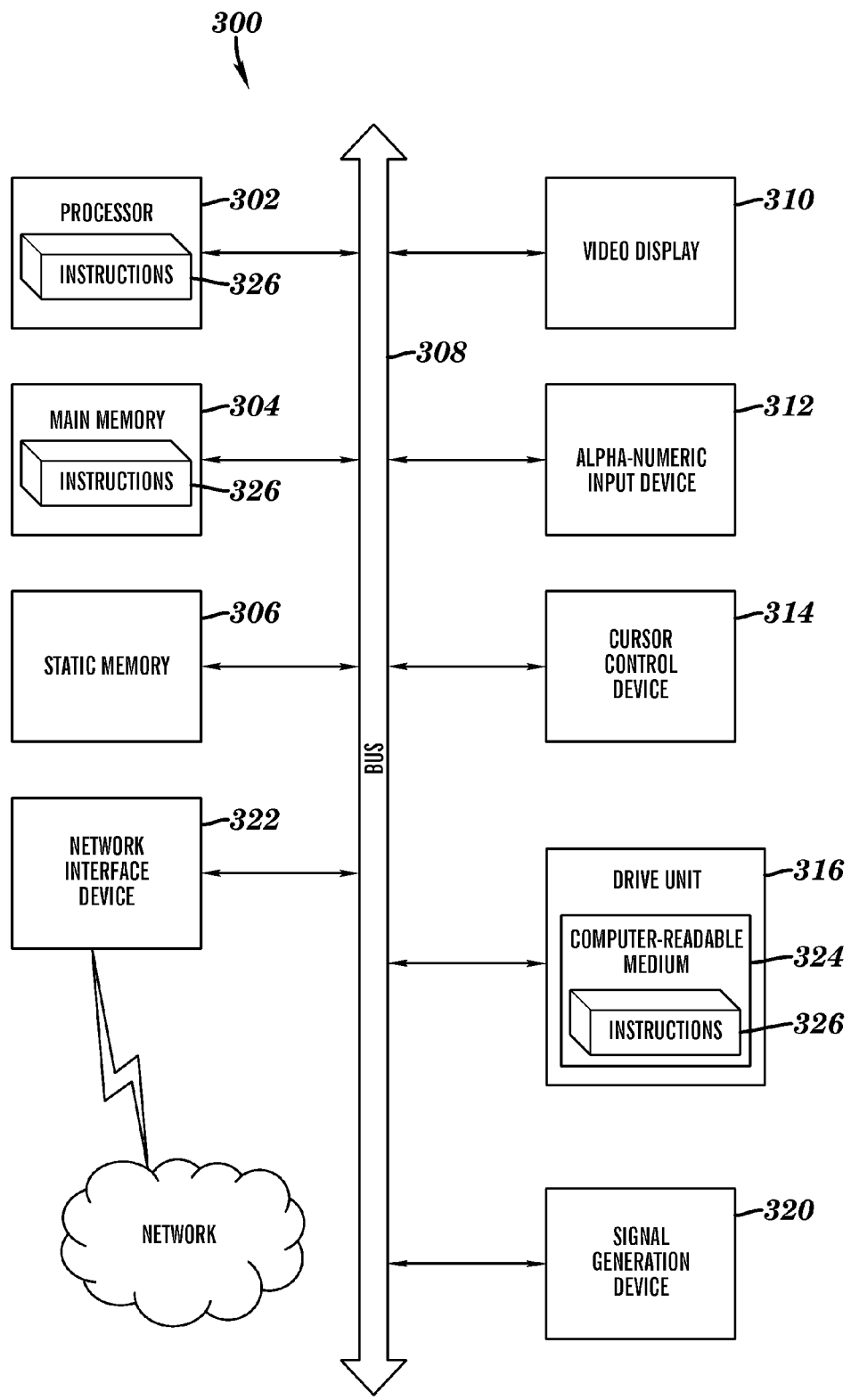
FIG. 16 is a block diagram of an exemplary embodiment of a computer system usable in connection with the foregoing embodiments.

FIG. 16 shows a diagrammatic representation of a machine in the exemplary form of a computer system 300 within which a set of instructions, for causing the machine to perform any one of the methodologies discussed above, may be executed. In alternative embodiments, the machine may include a network router, a network switch, a network bridge, Personal Digital Assistant (PDA), a cellular telephone, a web appliance or any machine capable of executing a sequence of instructions that specify actions to be taken by that machine.

The computer system 300 includes a processor 302, a main memory 304 and a static memory 306, which communicate with each other via a bus 308. The computer system 300 may further include a video display unit 310 (e.g., a liquid crystal display (LCD), plasma, cathode ray tube (CRT), etc.). The computer system 300 may also include an alpha-numeric input device 312 (e.g., a keyboard or touchscreen), a cursor control device 314 (e.g., a mouse), a drive (e.g., disk, flash memory, etc.,) unit 316, a signal generation device 320 (e.g., a speaker) and a network interface device 322.

The drive unit 316 includes a computer-readable medium 324 on which is stored a set of instructions (i.e., software) 326 embodying any one, or all, of the methodologies described above. The software 326 is also shown to reside, completely or at least partially, within the main memory 304 and/or within the processor 302. The software 326 may further be transmitted or received via the network interface device 322. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to include, but not be limited to, solid-state memories, optical and magnetic disks, and carrier wave signals.

Thus, a method and apparatus for generating custom reports in a network-based transaction facility have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

Furthermore, embodiments of the present invention include a computer program code-based product, which includes a computer readable storage medium having program code stored therein which can be used to instruct a computer to perform any of the functions, methods and/or modules associated with the present invention. The computer storage medium includes any of, but not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, and/or any other appropriate static or dynamic memory or data storage devices.

It should be noted that the various modules and other components of the embodiments discussed hereinabove may be configured as hardware, as computer readable code stored in any suitable computer usable medium, such as ROM, RAM, flash memory, phase-change memory, magnetic disks, etc., and/or as combinations thereof, without departing from the scope of the present invention.

It should be further understood that any of the features described with respect to one of the embodiments described herein may be similarly applied to any of the other embodiments described herein without departing from the scope of the present invention.

In the preceding specification, the invention has been described with reference to specific exemplary embodiments for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

The above systems are implemented in various computing environments. For example, the present invention may be implemented on a conventional IBM PC or equivalent, multi-nodal system (e.g., LAN) or networking system (e.g., Internet, WWW, wireless web). All programming and data related thereto are stored in computer memory, static or dynamic or non-volatile, and may be retrieved by the user in any of: conventional computer storage, display (e.g., CRT, flat panel LCD, plasma, etc.) and/or hardcopy (i.e., printed) formats. The programming of the present invention may be implemented by one skilled in the art of computer systems and/or software design.

Having thus described the invention, what is claimed is:

1. A computer implemented system in a client-server environment, for document research, aggregation, and compilation, the system comprising:
    a server computer including:
        a search module configured to generate a search interface displayable to a client communicably coupled to the server, and responsive to instructions received via the search interface, to search and sort selections of interest within a plurality of source documents;
        a customized report module configured to generate a custom report interface displayable to the client, and responsive to user selection instructions received via the custom report interface, to extract and aggregate the selections of interest into a customized report configured to simultaneously display a plurality of the selections of interest;
        a portable document module configured to enable source documents in the portable document format to be searched, sorted, and aggregated by the search module and customized report module;
        a presentation module configured to enable source documents in the presentation format to be searched, sorted, and aggregated by the search module and customized report module;
        a spread sheet module configured to enable source documents in the spread sheet format to be searched, sorted, and aggregated by the search module and customized report module; and
        a source document module which is separate from a customized report, configured to store and index a plurality of source documents in a plurality of native formats including text, portable document, presentation, and spread sheet, while maintaining the original native formats of the stored and indexed source documents;
        the source document module being configured to store each of the plurality of source documents in a plurality of sub-document portions populated to one or more tables; and
        a tool module configured to generate a tool interface displayable to the client, and responsive to instructions received from the client, link user comments to any of the sub-document portions;
    wherein the customized report module is configured to extract and aggregate the sub-document portions of the selections of interest, along with any of said linked user comments, into the customized report while maintaining the original native formats of the selections of interest.

2. The system of claim 1, wherein the customized report module is configured to extract and aggregate selections of interest disposed in one or more text formats.

3. The system of claim 1, wherein the search, customized report, portable document, presentation, and spread sheet modules are all disposed on computer readable media.

4. The system of claim 1, comprising a version control module in operative engagement with the customized report module, the version control module configured to track the version of the custom report generated by the customized report module, and, responsive to instructions received from the client, output a desired version of the custom report to the client.

5. The system of claim 4, wherein the version control module is configured to retain the user selection instructions, including location information for the selections of interest within the plurality of source documents, in order to regenerate the desired version of the custom report to the client.

6. The system of claim 1, wherein the source document module is configured to store source information for each of the plurality of sub-document portions.

7. The system of claim 6, wherein the source information is selected from the group consisting of author, publisher, publication date, copyright notice, and terms of use.

8. The system of claim 6, wherein the source document module is configured to store the plurality of source documents in one or more tables populated with the sub-document portions, source information, and with coordinate information for location of the sub-document portions within its source document.

9. The system of claim 8, comprising a figure handler configured to generate a figure interface displayable to the client, and responsive to instructions received via the figure interface to search and sort selections of interest in the form of figures within the plurality of source documents.

10. The system of claim 8, comprising a portable document handler configured to generate a portable document interface displayable to the client, and responsive to instructions received via the portable document interface to search and sort selections of interest in the portable document format within the plurality of source documents.

11. The system of claim 8, comprising a presentation handler configured to generate a presentation interface displayable to the client, and responsive to instructions received via the presentation interface to search and sort selections of interest in the presentation format within the plurality of source documents.

12. The system of claim 8, comprising an spread sheet handler configured to generate an spread sheet interface displayable to the client, and responsive to instructions received via the spread sheet interface to search and sort selections of interest in the spread sheet format within the plurality of source documents.

13. The system of claim 8, comprising a translation handler configured to generate a translation interface displayable to the client, and responsive to instructions received via the translation interface to provide language translation for selections of interest within the plurality of source documents.

14. The system of claim 8, wherein the customized report module is configured to output the custom report in any of a plurality of formats.

15. The system of claim 14, wherein the plurality of formats is selected from the group consisting of XML, text, portable document, presentation, spread sheet, and combinations thereof.

16. The system of claim 1, wherein the tool module is configured to permit the custom report to be displayed to, and comments to be added by, a plurality of clients.

17. A method for automated document research, aggregation, and compilation, in a client-server environment, the method comprising:
(a) generating, with a server computer, a search interface displayable to a client communicably coupled to the server;
(b) searching and sorting, with the server computer in response to instructions received via the search interface, selections of interest within a plurality of source documents;
(c) generating, with the server computer, a custom report interface displayable to the client;
(d) extracting and aggregating, with the server computer in response to user selection instructions received via the custom report interface, the selections of interest into a customized report configured to simultaneously display a plurality of the selections of interest;
(e) enabling, with the server computer in response to user selection instructions, documents in a portable document format to be searched, sorted, extracted and aggregated into the customized report;
(f) enabling, with the server computer in response to user selection instructions, documents in a presentation format to be searched, sorted, extracted and aggregated into the customized report;
(g) enabling, with the server computer in response to user selection instructions, documents in a spread sheet format to be searched, sorted, extracted and aggregated into the customized report; and
(h) storing and indexing, with the server computer, a plurality of source documents in a plurality of native formats including text, portable document, presentation, and spread sheet, while maintaining the original native formats of the stored and indexed source documents, and storing each of the plurality of source documents in a plurality of sub-document portions populated to one or more tables; and
(i) generating, with the server computer, a tool interface displayable to the client, the tool interface being configured to link user comments to any of the sub-document portions in response to instructions received from the client;
wherein said extracting and aggregating (d) includes extracting and aggregating the sub-document portions of the selections of interest, along with any of the linked user comments, into the customized report while maintaining the original native formats of the selections of interest.

18. The method of claim 17, wherein said extracting and aggregating (d) comprises extracting and aggregating selections of interest disposed in one or more text formats.

19. The method of claim 17, comprising (h) tracking, with the server computer, versions of the custom report, and outputting, in response to instructions received from the client, a desired version of the custom report.

20. The method of claim 19, wherein said tracking (h) comprises retaining the user selection instructions, including location information for the selections of interest within the plurality of source documents, in order to regenerate the desired version of the custom report.

21. The method of claim 17, comprising translating, with the server computer, in response to instructions received from the client, a plurality of the sub-document portions.

22. The method of claim 17, comprising storing, with the server computer, source information for each of the plurality of sub-document portions.

23. The method of claim 22, comprising storing, with the server computer, source information selected from the group consisting of author, publisher, publication date, copyright notice, and terms of use.

24. The method of claim 22, comprising storing, with the server computer, the plurality of source documents in one or more tables populated with the sub-document portions, source information, and with coordinate information for location of the sub-document portions within its source document.

25. The method of claim 24, wherein said storing comprises storing figures as sub-document portions of the source document.

26. The method of claim 24, comprising generating, with the server computer, a portable document interface displayable to the client for capturing user selection instructions associated with searching and sorting selections of interest in the portable document format within the plurality of source documents.

27. The method of claim 24, comprising generating, with the server computer, a presentation interface displayable to the client for capturing user selection instructions associated with searching and sorting selections of interest in the presentation format within the plurality of source documents.

28. The method of claim 24, comprising generating, with the server computer, a spread sheet interface displayable to the client for capturing user selection instructions associated with searching and sorting selections of interest in the spread sheet format within the plurality of source documents.

29. The method of claim 24, comprising generating, with the server computer, a translation interface displayable to the client for capturing user selection instructions associated with language translation of selections of interest within the plurality of source documents.

30. The method of claim 24, comprising outputting, with the server computer, the custom report in any of a plurality of formats.

31. The method of claim 30, comprising outputting, with the server computer, the custom report in a plurality of formats selected from the group consisting of XML, text, portable document, presentation, spread sheet, and combinations thereof.

32. The method of claim 17, comprising permitting, with the server computer via the tool interface, a plurality of users to add comments to the custom report.

33. An article of manufacture for automated document research, aggregation, and compilation, in a client-server environment, said article of manufacture comprising:
a non-transitory computer usable medium having a computer readable program code embodied therein, said computer usable medium having computer readable program code for:

generating, with a server computer, a search interface displayable to a client communicably coupled to the server;

searching and sorting, with the server computer in response to instructions received via the search interface, selections of interest within a plurality of source documents;

generating, with the server computer, a custom report interface displayable to the client;

extracting and aggregating, with the server computer in response to user selection instructions received via the custom report interface, the selections of interest into a customized report configured to simultaneously display a plurality of the selections of interest;

enabling, with the server computer in response to user selection instructions, documents in a portable document format to be searched, sorted, extracted and aggregated into the customized report;

enabling, with the server computer in response to user selection instructions, documents in a presentation format to be searched, sorted, extracted and aggregated into the customized report;

enabling, with the server computer in response to user selection instructions, documents in a spread sheet format to be searched, sorted, extracted and aggregated into the customized report; and storing and indexing, with the server computer, a plurality of source documents in a plurality of native formats including text, portable document, presentation, and spread sheet, while maintaining the original native formats of the stored and indexed source documents, and storing each of the plurality of source documents in a plurality of sub-document portions populated to one or more tables; and generating, with the server computer, a tool interface displayable to the client, the tool interface configured to link user comments to any of the sub-document portions in response to instructions received from the client;

wherein said extracting and aggregating includes extracting and aggregating the sub-document portions of the selections of interest, along with any of the linked user comments, into the customized report while maintaining the original native formats of the selections of interest.

* * * * *